US007539631B1

(12) United States Patent
El-Haj

(10) Patent No.: US 7,539,631 B1
(45) Date of Patent: May 26, 2009

(54) METHOD, SYSTEM AND PROGRAM FOR PROVIDING SUBSCRIPTION-BASED VIRTUAL COMPUTING SERVICES

(75) Inventor: Mohammad El-Haj, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 10/679,901

(22) Filed: Oct. 6, 2003

(51) Int. Cl.
*G06Q 30/00* (2006.01)
*G06F 9/00* (2006.01)
(52) U.S. Cl. .......................................... 705/26; 726/14
(58) Field of Classification Search .................. 705/25, 705/26, 27; 709/1, 205, 224; 715/744; 726/14
See application file for complete search history.

(56) References Cited

U.S. PATENT DOCUMENTS

| | | | |
|---|---|---|---|
| 6,151,618 | A | 11/2000 | Wahbe et al. |
| 7,003,481 | B2 * | 2/2006 | Banka et al. .................. 705/26 |
| 7,036,006 | B2 * | 4/2006 | Bandhole et al. ............... 713/1 |
| 7,065,637 | B1 * | 6/2006 | Nanja ............................ 713/1 |
| 7,093,113 | B2 * | 8/2006 | Lakshman ..................... 713/1 |
| 7,099,948 | B2 * | 8/2006 | Tormasov et al. ........... 709/229 |
| 2002/0049803 | A1 * | 4/2002 | Bandhole et al. ............ 709/104 |
| 2002/0069369 | A1 * | 6/2002 | Tremain ..................... 713/201 |
| 2002/0124072 | A1 * | 9/2002 | Tormasov et al. ........... 709/223 |
| 2002/0171678 | A1 * | 11/2002 | Bandhole et al. ............ 345/744 |
| 2003/0084104 | A1 * | 5/2003 | Salem et al. ................. 709/205 |
| 2003/0115442 | A1 * | 6/2003 | Whitney ........................ 713/1 |
| 2003/0220983 | A1 * | 11/2003 | Hui ............................. 709/219 |
| 2004/0220980 | A1 * | 11/2004 | Forster ........................ 707/204 |

FOREIGN PATENT DOCUMENTS

DE        10104984 A1 *  8/2002

OTHER PUBLICATIONS

Author unknown, "Ready For Virtual Computing?" Info-Tech Advisor Newsletter, London, UK, Dec. 9, 2002, p. 1.*
Unknown author, "Era of e-Business On Demand Accelerates With IBM Delivery of Computing Power On Tap-'Linux Virtual Services' From IBM Gives Businesses Utility-Like Access to Server Processing, Storage and Networking Capacity," Business Wire, New York, Jul. 1, 2002.*
Traut, Eric, Building the Virtual PC, Byte (International Edition), vol. 22, No. 11, p. 51-2, Nov. 1997, McGraw-Hill, USA.

* cited by examiner

*Primary Examiner*—Jeffrey A Smith
*Assistant Examiner*—Amee A Shah

(57) ABSTRACT

A system, including apparatuses and methods, for operating a subscription-based virtual computing services provider and for providing virtual computing services to subscribers thereto. The services provider enrolls subscribers to receive subscriber-selectable virtual computing services and provides such services to subscribers in exchange for the payment of a subscription fee based, at least in part, on the particularly selected computing services. The virtual computing services are provided through a communication network and accessible via subscriber devices having different degrees of robustness and via subscriber-selected user interfaces. A virtual non-volatile storage is allocated to each subscriber in a subscriber-selected storage capacity. The virtual non-volatile storage may be used for the storage and execution of software applications therein and/or for the storage of uploadable or downloadable data therein. Subscribers may configure their virtual non-volatile storage with a subscriber-selected operating system and/or software application(s) that may be provided and maintained by the services provider.

32 Claims, 16 Drawing Sheets

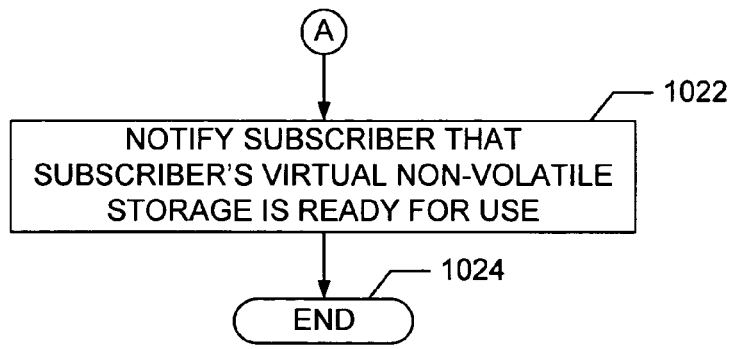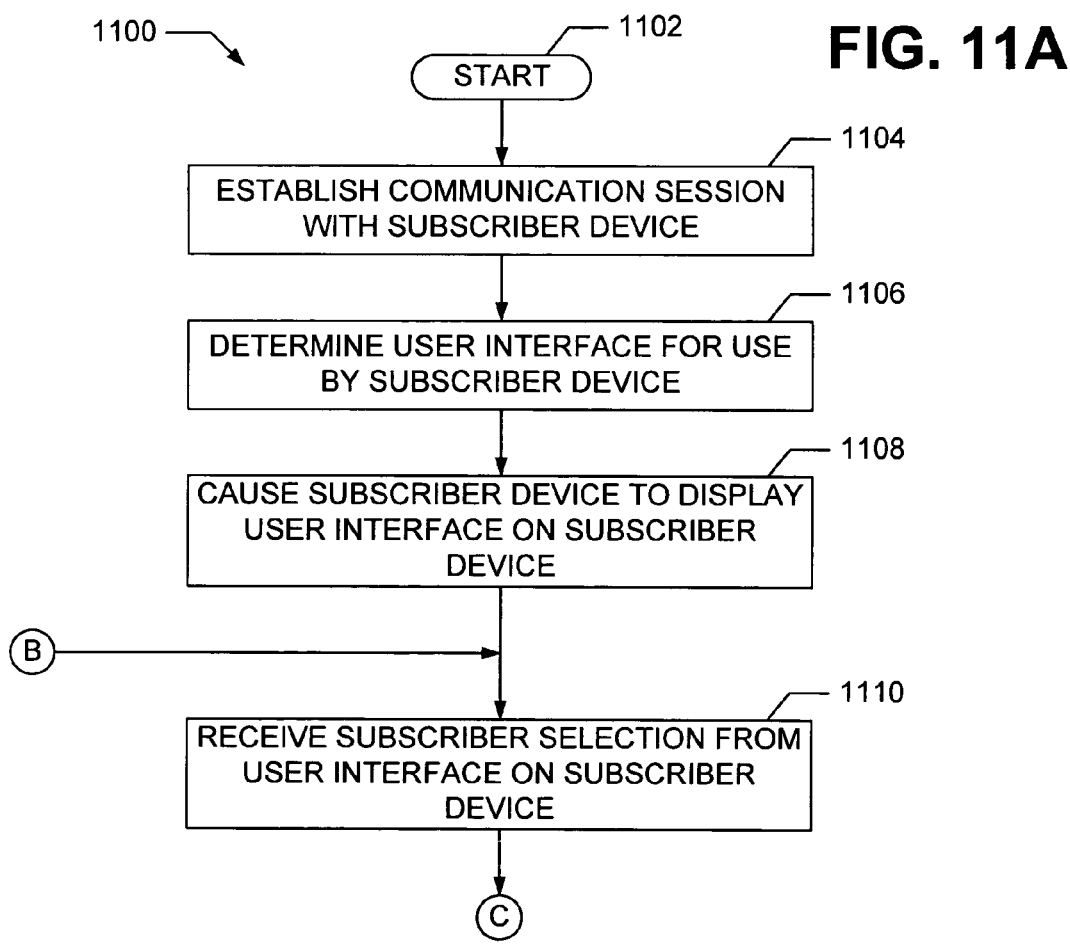

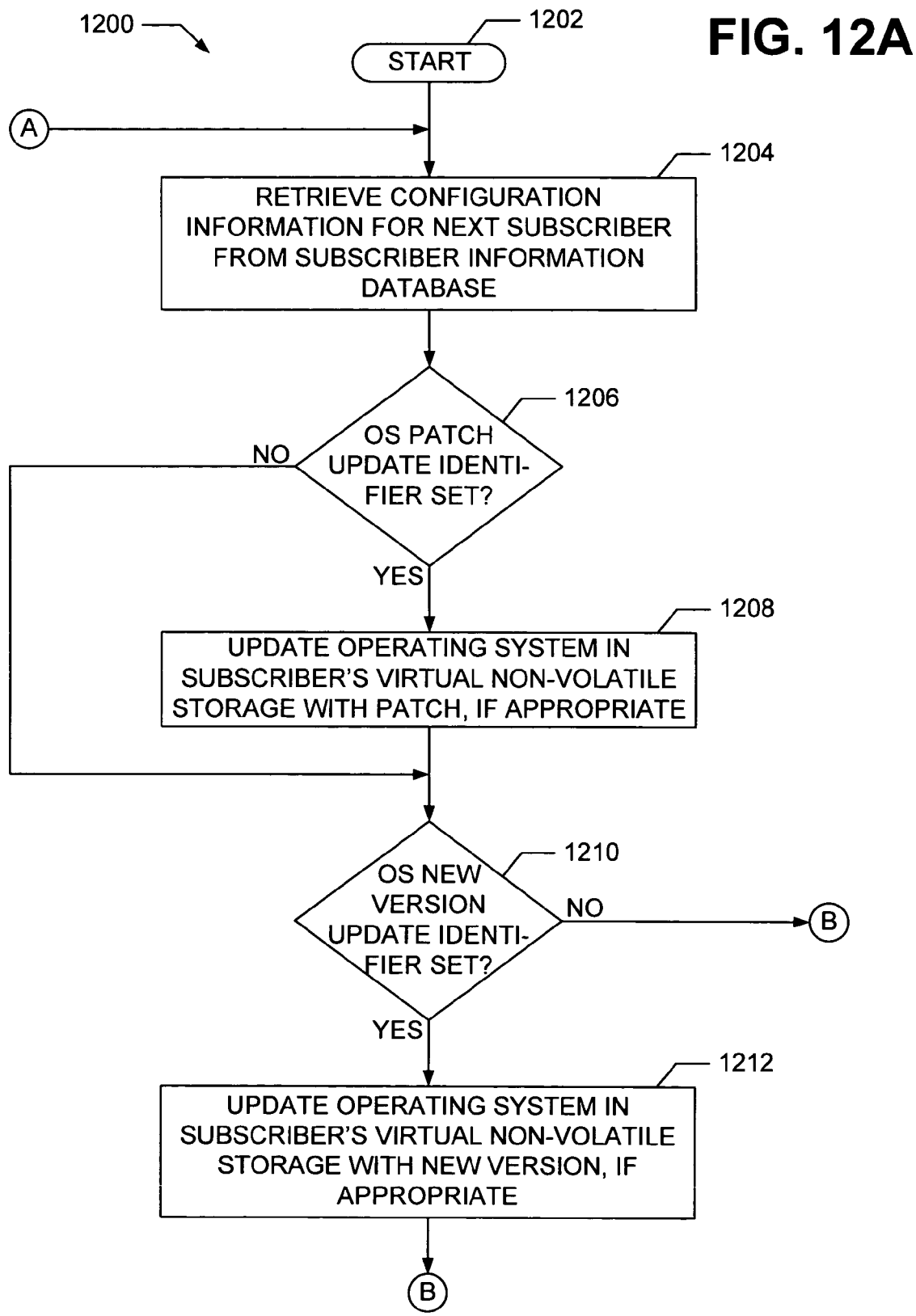

METHOD, SYSTEM AND PROGRAM FOR PROVIDING SUBSCRIPTION-BASED VIRTUAL COMPUTING SERVICES

TECHNICAL FIELD

The present invention relates, generally, to the field of computing services provision and, more specifically, to systems, apparatuses, and methods for providing subscription-based virtual computing services.

BACKGROUND OF THE INVENTION

The first personal computers became publicly available a few decades ago and, generally, comprised hardware, software, and firmware components such as a central processing unit, volatile and non-volatile memories, and operating system software with user interfaces. Each such computer was a stand-alone, self-contained device upon which a user could load, store and execute various software applications. When a user required a software application for a specific purpose, the user could go to a software store and purchase a software application to suit the particular need. However, if the purchased software application required capabilities that the user's computer did not have, the user might be forced to either upgrade his/her computer or purchase another computer that could run the software application. Similarly, if the software application became obsolete for the user's purposes, the user might either buy an upgraded version of the software application or a new software application with the desired capabilities.

The next era of personal computing provided the ability to communicatively link personal computers together through the use of a variety of communications networks. Modems and other communication devices were added to personal computers to enable them to access private intranet networks and the public Internet, in particular the World Wide Web. Such bi-directional communication capabilities allowed information to be shared between computers. For example, web sites built around centrally-located server computers were capable of distributing and receiving information from networked remote computers. Some such web sites allowed users to download software applications and/or software application upgrades, while others allowed users to upload data files for storage on the central server computer.

Recently, the popularity of the public Internet has encouraged the development of a variety of computing and communication devices that are able to access the World Wide Web, in either full or abbreviated form, depending on the capabilities of the device. For instance, most desktop personal computers provide a full range of uploading and downloading capabilities, while other devices may be narrowly tailored for specific capabilities. Examples of such other devices include network terminals, pocket PCs, wireless telephones, cable television converter boxes, and home video game machines. In addition, many traditional devices like kitchen appliances and automobiles now comprise "Internet-ready" devices, allowing a user the option of accessing the public Internet from virtually any location at any time, often without bulky equipment or complex connections to communication outlets.

Advances in real-time collaboration between networked computing devices have made it attractive for the software applications that were once purchased by users through software stores to be converted for use on "on-line service platforms" residing on server computers that are remotely accessible via the World Wide Web. Such on-line service platforms store and execute software applications on a server computer thereof, allowing the software applications to be utilized by users having computing or communication devices with less robust memory and processing capabilities. As a consequence, users with less robust communication or computing devices may now access and use software applications having many of the same capabilities as users with more robust personal communication or computing devices.

While such on-line service platforms enable users to access and use software applications with less robust communication or computing devices and without requiring that users purchase licenses to the software applications and periodically upgrade such software applications, on-line service platforms only allow users to access and use software applications that are available thereon. Therefore, if a user desires to use a software application not present on an on-line service platform, the user must find another on-line service platform that offers the software application or, alternatively, purchase a license to the software application and install the software application on his/her communication or computing device in order to use the software application since the on-line service platforms do not allow a user to load software applications thereon. Also, the on-line service platforms do not, generally, allow a user to upload data which the user may use in connection with a particular software application. As a consequence, a user may have to store large data files or databases on his/her communication or computing device and retain the responsibility for backing up such data files or databases. Additionally, each on-line service platform, typically, provides users with a single user interface that particular users may or may not prefer. If a user utilizes a number of on-line service platforms, the user must, therefore, become familiar with all of the different user interfaces of the different on-line service platforms in order to effectively utilize the on-line service platforms.

Therefore, there exists in the industry, a need for an on-line service provider that provides on-line computing services to users and for a system, including apparatuses and methods, for providing such on-line computing services to users, that address these and other problems or difficulties which exist now or in the future.

SUMMARY OF THE INVENTION

Broadly described, the present invention comprises systems, apparatuses, and methods for operating a subscription-based virtual computing services provider and for providing virtual computing services to subscribers thereto. More particularly, the present invention comprises systems, apparatuses, and methods which enable a virtual computing services provider to enroll various parties as subscribers for the receipt of virtual computing services which are subscriber-selectable and to provide such virtual computing services to subscribers in exchange for the payment of a subscription fee based, at least in part, on the particular computing services selected by subscribers. The services provider, preferably, provides the virtual computing services to subscribers via a communication network with the virtual computing services being accessible and usable through the use of a variety of subscriber devices having different degrees, or levels, of robustness. Because the virtual computing services are accessible via a variety of subscriber devices, the services provider may provide such services to subscribers whether they are at their offices, at their homes, residing temporarily at hotels, or in transit between locations.

The services provider, preferably, provides the virtual computing services to subscribers via respective virtual nonvolatile storage that are allocated and assigned to the subscribers in storage capacities selected by the subscribers. Using the systems, apparatuses, and methods of the present invention, the services provider enables subscribers to utilize their virtual non-volatile storage, at their own discretion, for the storage and execution of software applications therein and/or for the storage of data therein in the form of data files and databases which may be uploaded or downloaded thereto. The subscribers may configure their virtual non-volatile storage with an operating system and software application(s) of their selection that may be provided by the service provider or by the subscribers themselves. Also, the subscribers may, at their discretion, choose to have their selected operating system and software application(s) maintained by the service provider through the updating of the operating system and software application(s) with patches and new versions when such patches and new versions become available. Additionally, the subscribers may elect to have the contents of their respective virtual non-volatile storage backed-up on a nightly or weekly basis by the service provider. Further, the subscribers may select from a plurality of user interfaces through which they may utilize their respective virtual non-volatile storage.

Advantageously, the systems, apparatuses and methods of the present invention enable a services provider to provide a subscriber with virtual computing services and virtual non-volatile storage which are accessible through use of a plurality of different types of subscriber devices from virtually any location in the world. As a consequence, most subscribers need not upgrade their communication or computing devices to use the virtual computing services. The systems, apparatuses and methods of the present invention also allow a services provider to provide subscribers with virtual non-volatile storage that is usable by subscribers as they desire and which is configurable with software applications that are loaded and maintained by the services provider. Thus, subscribers are relieved of the burden and difficulties of periodically installing updates to their software applications and having to upgrade their communication or computing devices to be compatible with new releases of software applications. Additionally, because the systems, apparatuses, and methods of the present invention enable subscribers to select a user interface, subscribers are no longer faced with having to be familiar with the nuances of a plurality of user interfaces.

Other advantages and benefits of the present invention will become apparent upon reading and understanding the present specification when taken in conjunction with the appended drawings.

BRIEF DESCRIPTION OF THE DRAWINGS

FIGS. 10A and 10B display a flowchart representation of a method for enrolling subscribers for the receipt of computing services from a subscription-based virtual personal computing service provider in accordance with the embodiment of the present invention described herein.

FIGS. 11A-11C display a flowchart representation of a method for enabling access to and use of a subscriber's virtual non-volatile storage according to the embodiment of the present invention described herein.

FIGS. 12A-12C display a flowchart representation of a method for updating and backing-up subscribers' virtual non-volatile storage in accordance with the embodiment of the present invention described herein.

DETAILED DESCRIPTION OF THE INVENTION

Figure 1:
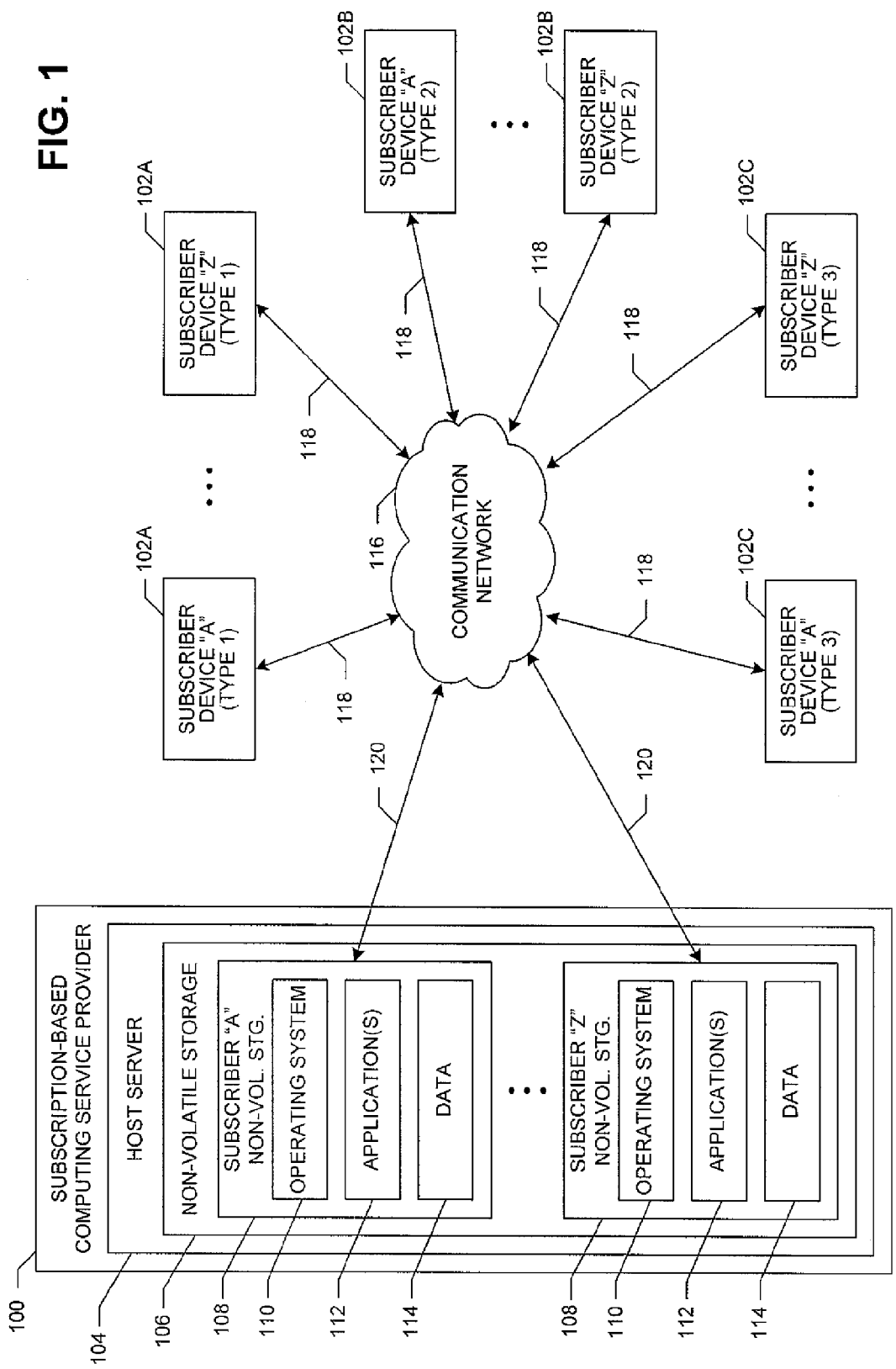
FIG. 1 displays a block diagram representation of a subscription-based virtual personal computing service provider and host server thereof having subscriber virtual non-volatile storage in accordance with an embodiment of the present invention described herein.

Referring now the drawings in which the numerals represent like elements or steps throughout the several views, FIG. 1 displays a block diagram representation of a subscription-based virtual personal computing service provider 100, in accordance with an embodiment of the present invention, that provides virtual personal computing services to users who enroll in or subscribe to (such users being also sometimes referred to herein as "enrollees" or "subscribers") a user-configurable service plan for such services. More particularly, the subscription-based virtual personal computing service provider 100 (also sometimes referred to herein as a "service provider 100") provides each subscriber, in exchange for payment of a subscription fee by the subscriber, with virtual non-volatile storage which is accessible by the subscriber through use of a subscriber device via a communication session with the service provider 100, regardless of the subscriber's location during the communication session or the type of subscriber device being used by the subscriber to enable such access. The virtual non-volatile storage may be utilized and configured by the subscriber as desired and generally, includes at least a operating system computer program (also sometimes referred to herein as an "operating system") stored therein, but may also include one or more application computer program(s) (also sometimes referred to herein as an "application(s)") stored therein. The operating system and applications, if any, may each be provided and installed in the virtual non-volatile storage by the subscriber or by the service provider 100 as a service to the subscriber. If either of the operating system or application(s), if any, are provided and installed in the subscriber's virtual non-volatile storage by the service provider 100, the subscription fee paid by the subscriber to the service provider 100 is, preferably, increased accordingly. The application(s) may include, at the subscriber's preference, an application distributed by a computer software vendor (which may or may not be the service provider 100) or an application developed by the subscriber and/or another party.

In a first exemplary scenario, a subscriber may utilize his/her virtual non-volatile storage for the storage of data (e.g., in the form of data files or databases which store word processing documents, spreadsheets, contact information, electronic mail messages, and other types of data) produced, delivered, and/or accessible by an application(s) present on the subscriber's device and for the storage of an operating system that enables, when executed, the storing, retrieval, and communication of such data to/from the virtual non-volatile storage. Thus, in such a first exemplary scenario, the computing services provided to the subscriber by the service provider 100 include, without limitation, the provision of communication facilities to enable the communication of data between the subscriber's device and the virtual non-volatile storage, and, if not provided and installed in the virtual non-volatile storage by the subscriber, the provision of an operating system stored therein.

In a second exemplary scenario, a subscriber may utilize his/her virtual non-volatile storage for the storage of an application(s) which, when executed, retrieves or produces data (e.g., in the form of data files or databases which store word processing documents, spreadsheets, contact information, electronic mail messages, and other types of data) that is stored on the subscriber's device and for the storage of an operating system that enables, when executed, the storing, retrieval, and communication of such data to/from the subscriber's device. Thus, in such a second exemplary scenario, the computing services provided to the subscriber by the service provider 100 include, but are not limited to, the provision of the virtual non-volatile storage, the provision of communication facilities to enable the communication of data between the subscribers device and the virtual non-volatile storage, and, if not provided and installed in the virtual non-volatile storage by the subscriber, the provision of an operating system and application(s) stored therein.

In a third exemplary scenario, a subscriber may utilize his/her virtual non-volatile storage in a manner which is, substantially, a combination of the first and second exemplary scenarios described above for the storage of: data (e.g., in the form of data files or databases which store word processing documents, spreadsheets, contact information, electronic mail messages, and other types of data) produced, delivered, and/or accessible by an application(s) present on the subscriber's device or stored in the subscriber's virtual non-volatile storage; one or more application(s) which, when executed, retrieves or produces data that is stored on the subscriber's device or in the subscriber's virtual non-volatile storage; and, for the storage of an operating system that enables, when executed, the storing, retrieval, and communication of such data to/from the subscriber's device or the subscriber's virtual non-volatile storage. Thus, in such a third exemplary scenario, the computing services provided to the subscriber by the service provider 100 include, but not limited to, the provision of the virtual non-volatile storage, the provision of communication facilities to enable the communication of data between the subscriber's device and the virtual non-volatile storage, and, if not provided and installed in the virtual non-volatile storage by the subscriber, the provision of an operating system and application(s) stored therein.

It should be understood that the scope of the present invention comprises other scenarios related to the manner in which a subscriber may utilize his/her virtual non-volatile storage which may be similar to or different from the scenarios described therein. It should also be understood that the scope of the present invention comprises the interaction of the service provider 100 with a variety of subscriber devices as described below, and that the manner in which a particular subscriber device, generally, utilized by the subscriber in connection with his/her virtual non-volatile storage and/or upon personal preference.

In addition to the computing services described above, the subscription-based virtual personal computing service provider 100 also provides, if desired by a subscriber and upon the payment of an increased subscription fee, automatic updating of the operating system and/or application(s), if any, stored in a subscriber's virtual non-volatile storage without intervention by the subscriber. Thus, a subscriber need only know how to connect to the service provider 100 and to use the operating system and application(s), if any, and is relieved of having to perform such updating and of having to know the details associated with the performance of such updating. Depending on the desires of a subscriber and the amount of the increased subscription fee paid by the subscriber, such updating may include the application of patches, bug fixes, and/or service packs to the operating system and/or application(s), if any, and/or the installation of new versions of the operating system and/or application(s), if any, when such patches, bug fixes, service packs, and/or new versions become available.

The subscription-based virtual personal computing service provider 100, as illustrated in FIG. 1, comprises one or more host server computer systems 104 (also sometimes referred to herein as "host server(s) 104") with each host server 104 having, or having access to, non-volatile storage 106 which is portionable, or partitionable, among subscribers to provide each subscriber with a respective portion 108, or partition 108, of such non-volatile storage 106 (also sometimes referred to herein as the subscriber's "virtual non-volatile storage 108"). The size, or capacity, of each subscriber's non-volatile storage portion 108 (and, hence, the subscriber's virtual non-volatile storage 108) is initially determined by the subscriber (i.e., via subscriber selection) during subscription to, or enrollment in, a subscriber-configured service plan with the service provider 100 under which the subscriber agrees to make payment of an appropriate subscription fee to the service provider 100. The subscriber's non-volatile storage portion 108 may be re-sized at a later date if desired by the subscriber with an appropriately corresponding change to the subscriber's subscription fee. Each non-volatile storage portion 108 may be configured initially by its respective subscriber during subscription to be loaded with, and store, a subscriber-selected operating system 110 and one or more subscriber-selected application(s) 112 provided by the service provider 100. The subscriber may alternatively or additionally, at his/her discretion, provide and install an operating system 110 and/or one or more application(s) 112 in his/her non-volatile storage portion 108 in lieu of having the service provider 100 do so. Regardless, each non-volatile storage portion 108 may, preferably, include only one operating system 110 which is active at a particular time. Each non-volatile storage portion 108 may also store data 114 in the form of data files and/or databases which may be used by the application (s) 112 or be merely stored by a subscriber in the non-volatile storage portion 108 for use by another application operable on a computer system other than the host server 104.

Each subscriber utilizes a subscriber device to communicatively connect to a host server 104, as illustrated in FIG. 1, in order to access his/her respective non-volatile storage portion 108 of a non-volatile storage 106 (i.e., his/her respective virtual non-volatile storage 108) and the data, operating system, and/or application program(s) stored therein. Preferably, the subscriber devices establish respective communication sessions with an appropriate host server 104 by communicatively connecting to the host server 104 via a communication network 116 and communication links 118, 120. The communication network 116 and communication links 118, 120 comprise the communication facilities and infrastructure necessary to allow a bi-directional communication session to be established between a subscriber device and the appropriate host server 104 via one or more media. Such facilities and infrastructure include, for example and not limitation, one or more of the public switched telephone network (PSTN), the Internet, local area networks (LANs), wide area networks (WANs), and other forms of communication networks existing now or in the future having analog, digital, wired and wireless communication channels (including, but not limited to, wired communication channels providing plain old telephone service (POTS), ISDN service, xDSL service, broadband cable service, or other communication services, wireless communication channels providing radio frequency, optical (e.g., infrared), satellite, or other communication services, and carrier technologies utilizing copper wire, optical fiber, radio frequency signals, infrared signals, satellites, or other technologies, devices, and materials).

The subscriber devices, according to the embodiment of the present invention described herein, comprise a first plurality of subscriber devices 102A of a first type, a second plurality of subscriber devices 102B of a second type, and a third plurality of subscriber devices 102C of a third type. Subscriber devices 102A of the first type, preferably, include computing and/or communication devices which are often referred to as "thick" client devices. Generally, such subscriber devices 102A have one or more processing units with substantial computing capability, a substantial amount of volatile memory, a substantial amount of non-volatile storage, a very robust operating system, and one or more robust application program(s) which allow a user thereof to perform functions including, for example and not limitation, sophisticated word processing, spreadsheet processing, contact information maintenance, electronic mail communication, database management, and other functions. Such subscriber devices 102A are often considered to be relatively immobile or non-movable and may include, without limitation, desktop or similar computer systems present in a subscribers' homes or offices, and desktop or similar computer systems present in hotels or other structures at which subscribers temporarily reside. It should be understood that a subscriber does not need to own a subscriber device which he/she utilizes to access his/her virtual non-volatile storage. Thus, a subscriber may, as previously alluded to above, use a subscriber device 102A possessed by a hotel or other party to access his/her virtual non-volatile storage while the subscriber is away from his/her home or office.

Subscriber devices 102B of the second type, preferably, include computing and/or communication devices which are, typically, referred to as "thin" client devices. Such subscriber devices 102B, generally, have one processing unit with very minimal computing capability, a minimal amount of volatile memory, a minimal amount of non-volatile storage, a relatively non-robust operating system, and one or more non-robust application program(s) which allow a user thereof to perform only basic functions or non-robust forms of other functions including, for example and not limitation, voice and/or minimal data communications (including, but not limited to, instant messaging and electronic mail communication), contact information maintenance, and other functions requiring non-robust capabilities. Such subscriber devices 102A are often considered to be highly mobile or movable and may include, without limitation, low-end wireless communication devices, low-end personal digital assistants, low-end palm computers, and other similar devices. Using a "thin" subscriber device 102B, a subscriber may access data and/or execute application(s) stored in his/her virtual non-volatile storage from anywhere that a communication session may be established between the subscriber's device 102B and an appropriate host server 104 of the service provider 100, including, for example and not limitation, from an airport, a shopping mall, a vehicle, a parking lot, a street corner, or a field.

Subscriber devices 102C of the third type, preferably, include computing and/or communication devices which are not, typically, referred to as "thick" or "thin" client devices, but are instead, somewhere between "thick" and "thin" client devices in terms of processing and functional capability robustness. Such subscriber devices 102C, generally, have one processing unit with moderate computing capability, a moderate amount of volatile memory, a moderate amount of non-volatile storage, a moderately robust operating system, and one or more robust or moderately robust application program(s) which allow a user thereof to perform substantially the same functions as may be performed by subscriber devices 102A described above, but at a slightly slower processing speed and with, perhaps, slightly less functionality. Such functions include, for example and not limitation, word processing, spreadsheet processing, contact information maintenance, electronic mail communication, database management, and other functions. Such subscriber devices 102C are often considered to be moderately mobile or movable and may include, but not be limited to, portable laptop computers, high-end wireless communication devices, high-end personal digital assistants, high-end palm computers, and other similar devices.

As the foregoing paragraphs attempt to convey, in a spectrum of robustness, subscriber devices 102A represent or correspond to more robust devices at a first end of the spectrum and subscriber devices 102B represent or correspond to less robust devices at a second and opposite end of the spectrum. Subscriber devices 102C represent or correspond to devices somewhere between the first and second ends of the spectrum. However, it should be understood that as the relevant technology advances, the distinctions between subscriber devices 102A, 102B, 102C of the first, second, and third types may become less pronounced and each such subscriber device 102A, 102B, 102C may have substantially similar levels of robustness, capabilities, and functionality.

The manner in which a particular subscriber utilizes his/her virtual non-volatile storage may, as briefly described above, be somewhat dependent upon the type of subscriber device most often utilized by the subscriber in connection with his/her virtual non-volatile storage and/or upon personal preference. For example, a first subscriber who travels little and uses a subscriber device 102A of the first type (i.e., a "thick" subscriber device 102A), but who cannot or does not desire to store certain data on his/her subscriber device 102A (e.g., because the subscriber device 102A has insufficient non-volatile storage capacity, because the subscriber does not periodically backup the non-volatile storage of his/her subscriber device 102A and desires to utilize the service provider's data backup computing service, or because of various other reasons), may utilize his/her virtual non-volatile storage as described above with respect to the first scenario. In other words, the first subscriber may upload, store, and retrieve data used or produced by an application(s) present on his/her subscriber device 102A as necessary, thereby supplementing the non-volatile storage capacity of his/her subscriber device 102A.

In another exemplary use of subscriber device, a second subscriber who travels a great deal may prefer to use a subscriber device 102B of the second type (i.e., a "thin" subscriber device 102B) because such a device 102B is light weight, requires little space, and is, otherwise, convenient for travel purposes. Because his/her subscriber device 102B is not sufficiently robust enough to perform word processing and spreadsheet processing, the second subscriber may utilize his/her virtual non-volatile storage as described above with respect to the second scenario. Thus, the subscriber may utilize his/her subscriber device 102B essentially as a "dumb" terminal to access and cause the execution of the word processing and spreadsheet processing applications which are stored in his/her virtual non-volatile storage, thereby taking advantage of the robustness of a host server 104 to store and execute the word processing and spreadsheet processing applications while selectively storing data input to or output by such applications in the non-volatile storage of his/her subscriber device 102B to enhance the perceived security of such data.

In still another exemplary use of subscriber device 102, a third subscriber who travels more than the first subscriber described above, but less than the second subscriber described above uses a subscriber device 102C of the third type. The third subscriber desires to use the robustness provided by a host server 104, the automatic updating of applications by the service provider 100, and the data backup computing service provided by the service provider 100 for many of the applications that he/she uses, but yet desires to store particular data on his/her subscriber device 102C and to store and execute particular applications on his/her subscriber device 102C. Therefore, the third subscriber uses his/her subscriber device 102C as described above with respect to the third scenario. Thus, the third subscriber executes some applications and stores data, in his/her virtual non-volatile storage, which is used by or produced from such applications on an appropriate host server 104, and executes other applications and stores data used or produced from such other applications on his/her subscriber device 102C.

Figure 2:
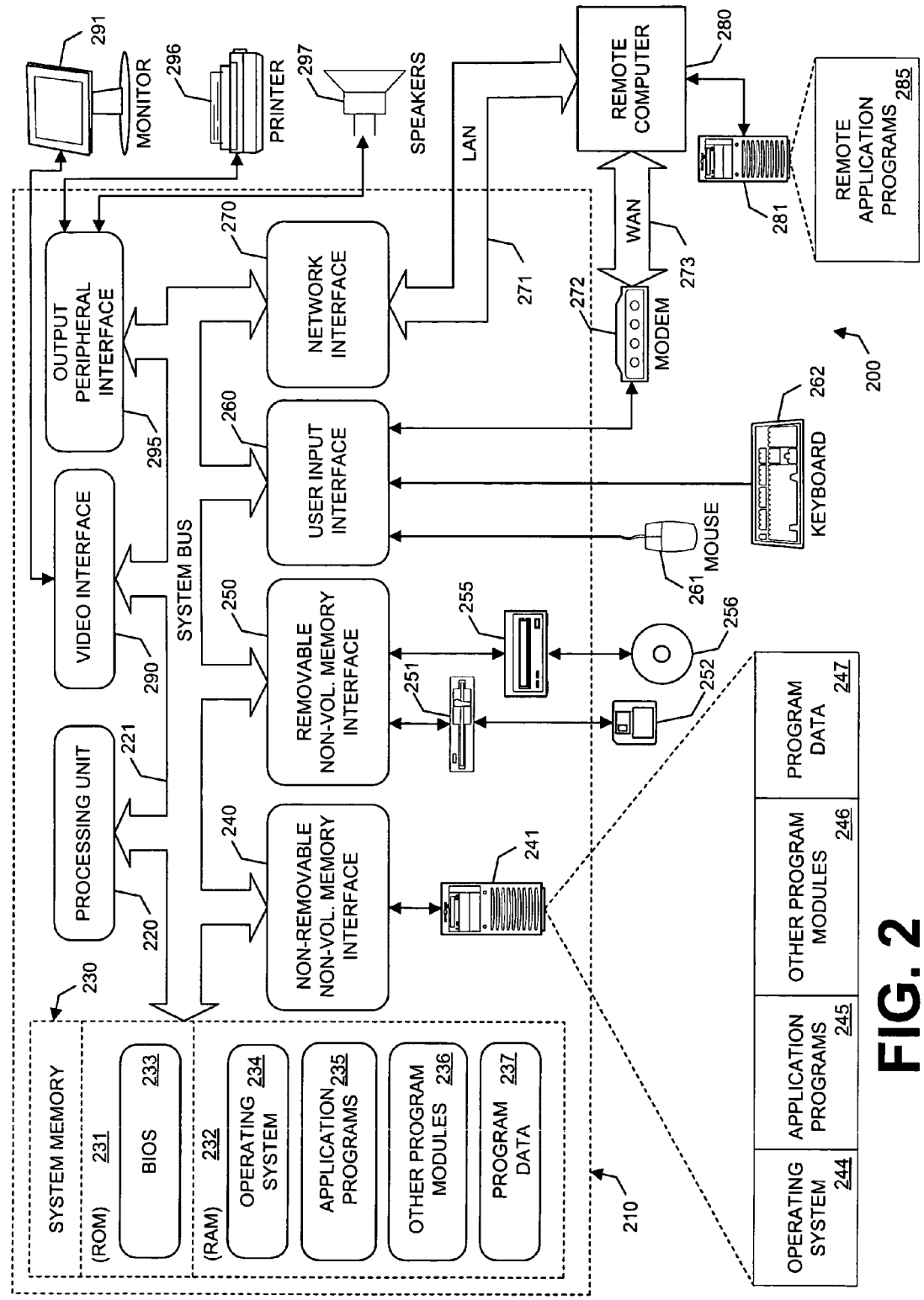
FIG. 2 displays a block diagram representation of hardware components of a computer system and environment therefor which may be utilized to implement a host server and host server environment therefor of the subscription-based virtual personal computing service provider of FIG. 1.

The one or more host server(s) 104 of the service provider 100 and subscriber devices, preferably, comprise respective computer hardware and software components which are operable in cooperation to provide the respective functionality described herein. FIG. 2 displays a block diagram representation of the hardware components of a computer system 210 and environment therefore 200 which may be utilized to implement the host server(s) 104 and an associated host server environment therefore in accordance with the described embodiment of the present invention. Although described herein as including one or more host server(s) 104, the service provider 100, in a practical implementation of the present invention, preferably comprises a plurality of host servers 104 with each having hardware components substantially similar to computer system 210 and each being related and communicatively connected to another host server 104 in a manner substantially similar to the relationship and communicative connection of computer system 210 and remote computer system 280.

FIG. 2 displays a block diagram representation of a computing environment 200 and computer systems 210, 280 thereof which the present invention may utilize in accordance with the embodiment described herein. The computing environment 200 and computer systems 210, 280 thereof represent only one example of a suitable computing environment and computer systems for the practice of the present invention and are not intended to suggest any limitation as to the scope of use or functionality of the invention. Nor should the computer systems 210, 280 be interpreted as having any dependency or requirement relating to any one or combination of components illustrated in the exemplary computing environment 200.

Hence, it should be understood that the present invention is operational with numerous other general purpose or special purpose computing system environments or configurations. Examples of well-known computing systems, environments, and/or configurations that may be appropriate or suitable for use as computer systems of the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may also be described in the general context of comprising computer-executable instructions, such as program modules, being executed by a computer system. Generally, program modules include routines, programs, programming, objects, components, data, data structures, etc. that perform particular tasks or implement particular abstract data types. The present invention may be practiced in distributed computing environments where tasks are performed by remote processing devices that are linked through a communications network. In a distributed computing environment, program modules may be located in both local and remote computer storage media, including, without limitation, in memory storage devices.

With reference to FIG. 2, exemplary computer systems of the present invention include general purpose computing devices in the form of a computer system 210. Components of computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as the "Mezzanine bus").

Computer system 210, preferably, includes a variety of computer-readable media. Computer-readable media may comprise any available media that can be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which can be used to store the desired information and which can be accessed by computer system 210.

Communication media typically embodies computer-readable instructions, data, data structures, program modules, programs, programming, or routines in a modulated data signal such as carrier wave or other transport mechanism and includes any information delivery media. The term modulated data signal means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The system memory 230 includes computer storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bi-directional communication link between the computers may be used.

Figure 3:
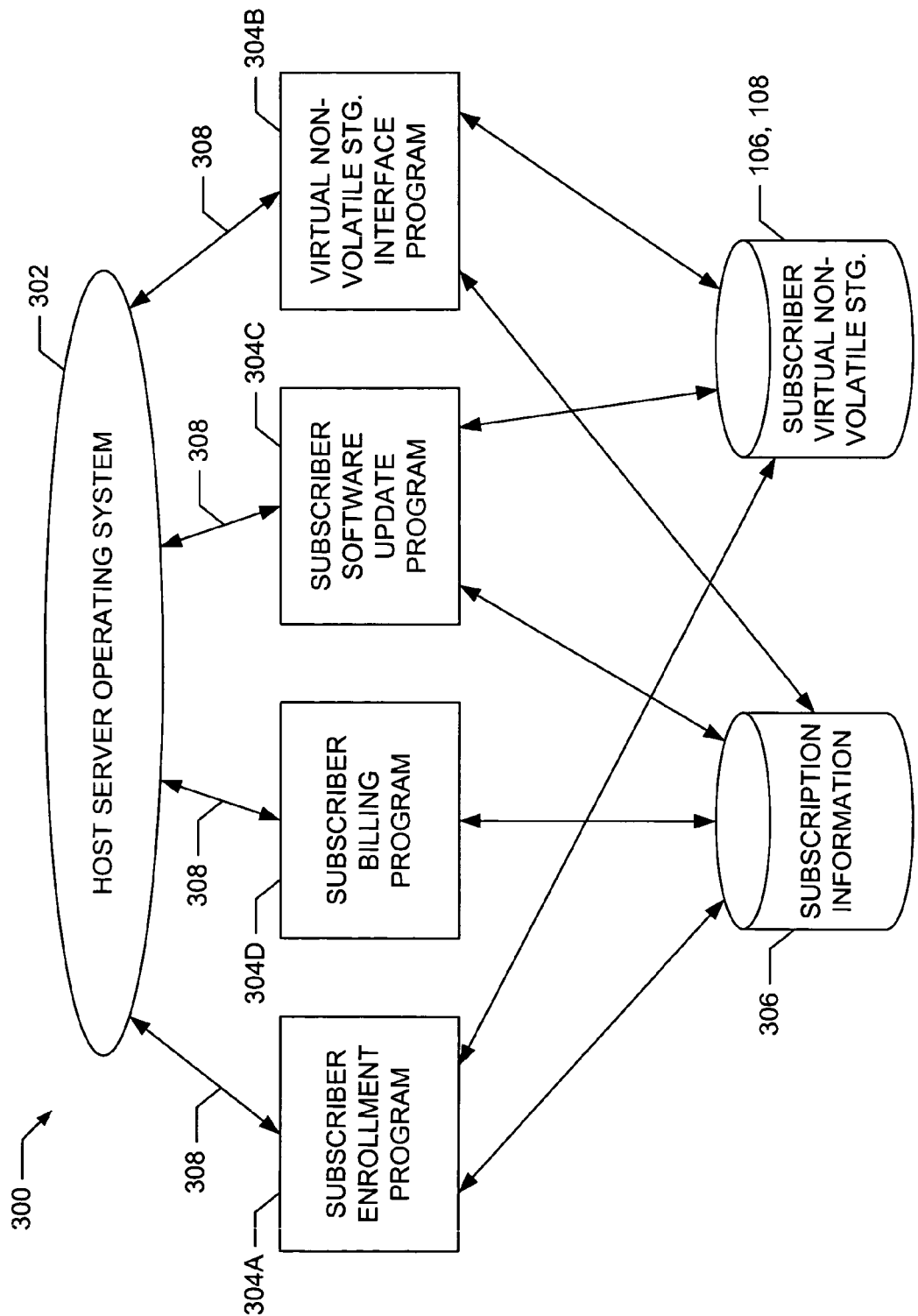
FIG. 3 displays a block diagram representation of computer software components of a host server in accordance with the embodiment of the present invention described herein.

FIG. 3 displays a block diagram representation of the computer software components 300 of a host server 104 in accordance with the embodiment of the present invention described herein. The computer software components 300, preferably, comprise a host server operating system 302, a plurality of computer software programs, or software modules, 304A-D, a subscriber information database 306, and subscriber virtual non-volatile storage 106 which reside and are stored in the non-volatile memory of a host server 104. The host server operating system 302 includes a plurality of computer executable software instructions which, when executed by a host server's processing unit, enables the host server 104 to perform basic functions necessary for the overall management and control of the host server's operation. Such basic functions, preferably, include managing the execution of computer software programs 304A-D, enabling the storage and retrieval of data from data flies and/or databases, and directing the communication of data between processes and with communication network 116. A host server operating system 302, acceptable in accordance with the embodiment of the present invention described herein, is MICROSOFT WIDOWS SERVER 2003 available from Microsoft Corporation of Redmond, Wash. Similarly, each computer software program 304A-D includes a plurality of computer executable software instructions. However, when such computer executable software instructions are executed by a host server's processing unit, the instructions cause the host server 104 to implement various methods of the present invention by performing various functions for the provision of computing service provider 100 to subscribers thereof.

A first computer software program 304A, referred to herein as a subscriber enrollment program 304A, is operable to enable a user to enroll as a subscriber for the receipt of computing services from the service provider 100 in accordance with a method 1000 for enrolling subscribers described below. The subscriber enrollment program 304A is, preferably, adapted to cause a host server 104 to: collect subscriber information from a user desiring to enroll for the receipt of computing services from the service provider 100; store and retrieve collected subscriber information in/from subscriber information database 306; enable a subscriber to modify his/her subscriber information after his/her initial enrollment; calculate the subscription fee associated with the provision and maintenance of the subscriber's virtual non-volatile storage 108 in accordance with the specifications therefor present in the subscriber information; allocate the subscriber's virtual non-volatile storage 108 from virtual non-volatile storage 106 and associate the virtual non-volatile storage 108 with the subscriber; and, configure the subscriber's virtual non-volatile storage 108 in accordance with the subscriber information collected from the subscriber.

Subscriber information, preferably, comprises information or data which is associated with a subscriber's virtual non-volatile storage 108 and includes, without limitation, personal information, billing information, and virtual non-volatile storage configuration information. The personal information, preferably, includes information or data enabling communication with the subscriber (e.g., the subscriber's name, address, telephone number, and electronic mail address) and security information (e.g., a username and password) which the host server 104 uses to control access to the subscriber's virtual non-volatile storage 108. The billing information, preferably, includes information or data enabling the service provider 100 to bill the subscriber, and collect payment from the subscriber, for the subscription fee charged by the service provider 100 for the service provider's provision of the subscriber's virtual non-volatile storage 108 and related computing services to the subscriber. Such billing information, generally, includes the name, address, telephone number, electronic mail address of the party who is to make payment of the subscription fee, and also includes a credit card number (and associated expiration date) belonging to such party and against which the subscription fee is to be debited by the service provider 100.

The virtual non-volatile storage configuration information comprises information or data specifying various configuration parameters which control and determine the configuration and maintenance of the subscriber's virtual non-volatile storage 108 by the service provider 100 and, hence, the amount of the subscription fee paid by the subscriber to the service provider 100. Such configuration parameters include, without limitation: a storage capacity specifying the storage capacity, or size in terms of the number of bytes, of the subscriber's virtual non-volatile storage 108; an operating system identifier that identifies the operating system which is stored in, or loaded into, the subscriber's virtual non-volatile storage 108 by the host server 104 and which is executed by the host server 104 when the subscriber is accessing or utilizing his/her virtual non-volatile storage 108; one or more application identifiers that identify one or more respective application(s) which are stored in, or loaded into, the subscriber's virtual non-volatile storage 108 by the host server 104 and which may be executed by the host server 104, upon the subscriber's direction, when the subscriber is accessing or utilizing his/her virtual non-volatile storage 108; an operating system patch update identifier that identifies whether the host server 104 is to automatically update the operating system of the subscriber's virtual non-volatile storage 106 with patches, bug fixes, and/or service packs when they become available; an operating system new version update identifier that identifies whether the host server 104 is to automatically update the operating system of the subscriber's virtual non-volatile storage 106 with a new version of the operating system when it becomes available; an application patch update identifier that identifies whether the host server 104 is to automatically update the application(s) of the subscriber's virtual non-volatile storage 106 provided by the service provider 100 with patches, bug fixes, and/or service packs when they become available; an application new version update identifier that identifies whether the host server 104 is to automatically update the application(s) of the subscriber's virtual non-volatile storage 106 provided by the service provider 100 with new versions of the application(s) when they become available; a nightly backup identifier that identifies whether backups of the subscriber's virtual non-volatile storage 108 are to be performed by the host server 104 on a nightly basis; and, a weekly backup identifier that identifies whether backups of the subscriber's virtual non-volatile storage 108 are to be performed by the host server 104 on a weekly basis.

Figure 4:
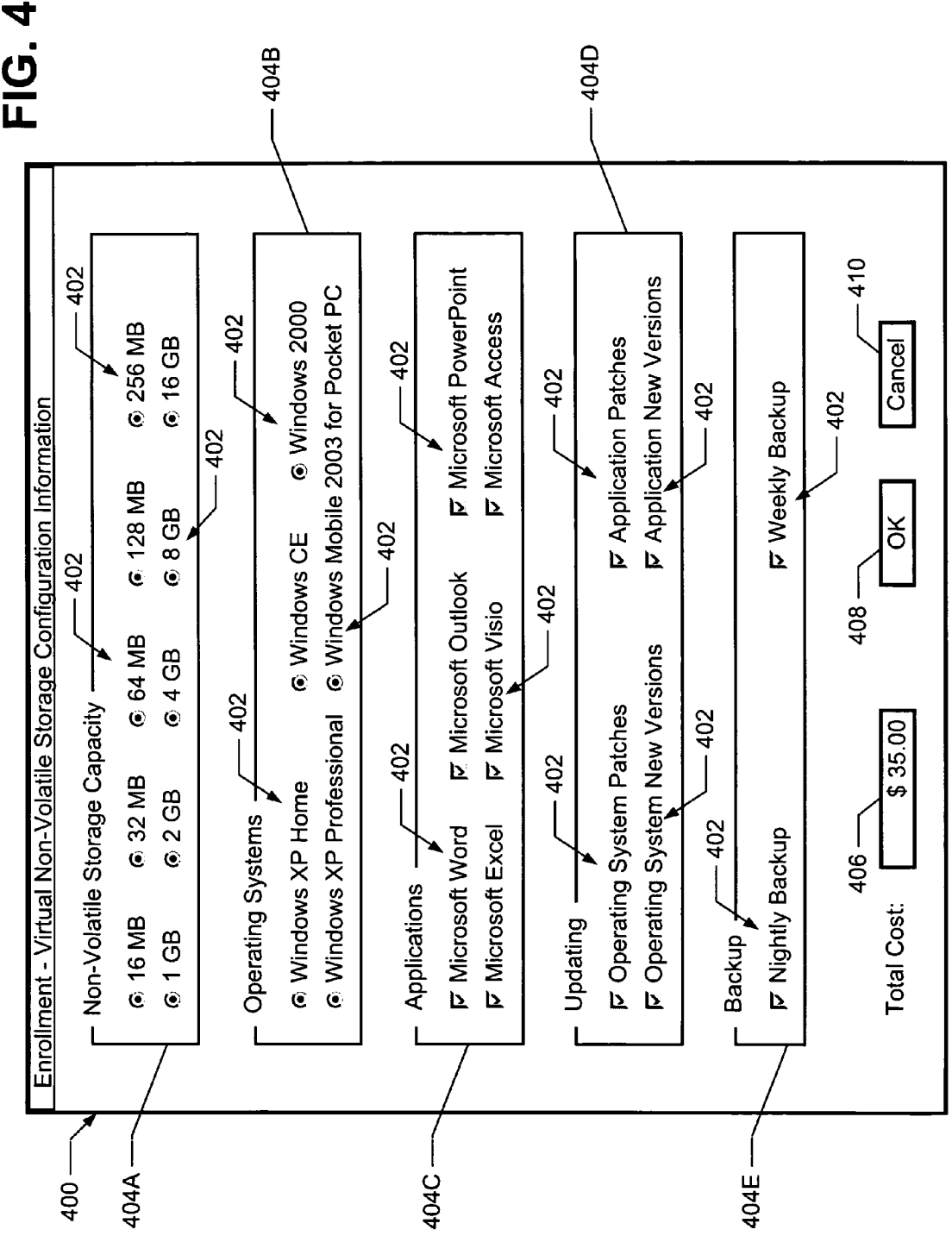
FIG. 4 displays a pictorial representation of a first subscriber enrollment window of the computer software components of FIG. 3.
Figure 5:
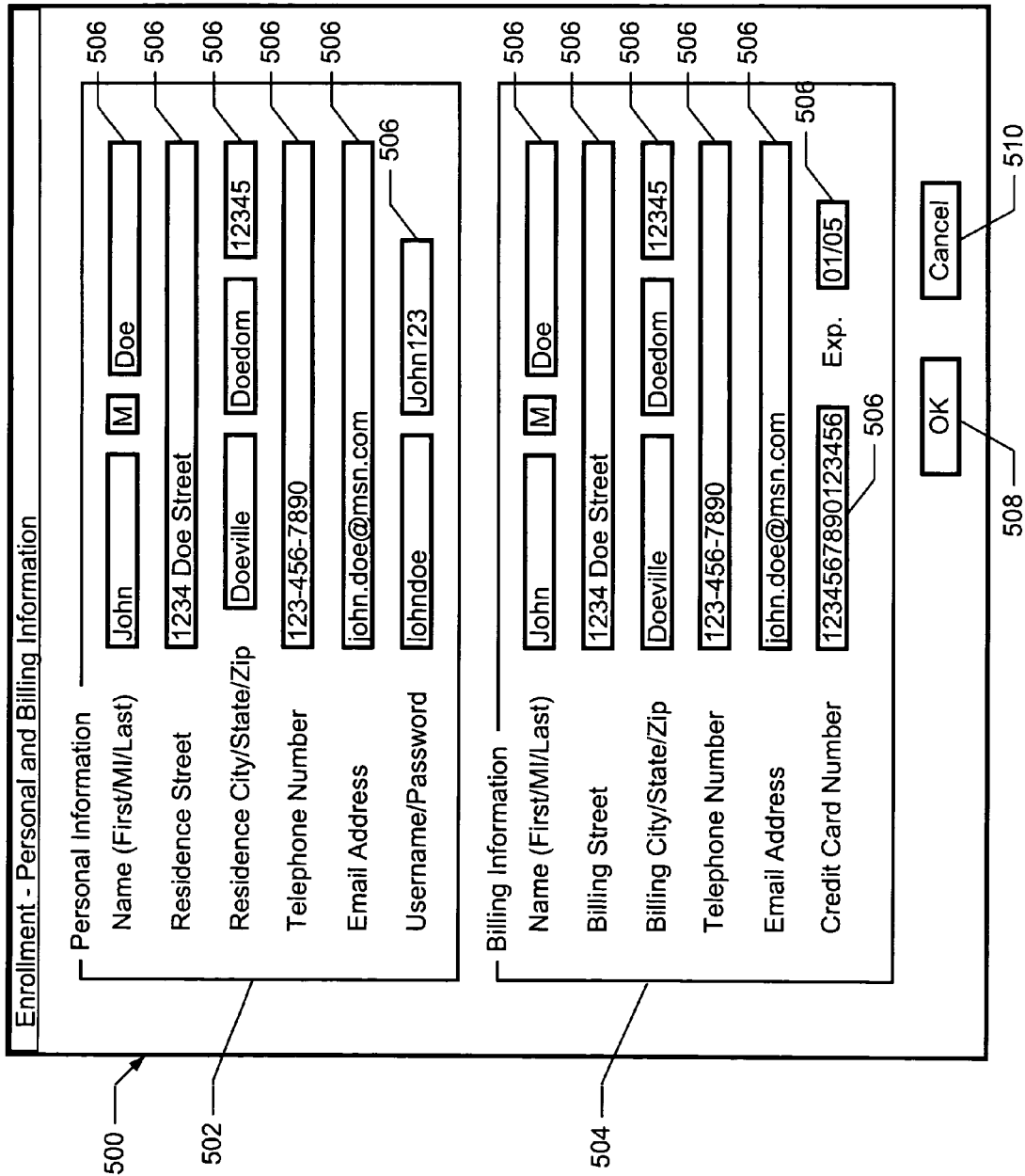
FIG. 5 displays a pictorial representation of a second subscriber enrollment window of the computer software components of FIG. 3.

To aid in the collection and modification of subscriber information, the subscriber enrollment program 304A includes a first subscriber enrollment window 400 (see FIG. 4) and a second subscriber enrollment window 500 (see FIG. 5). The subscriber enrollment program 304A causes the display of such windows 400, 500 on a user/subscriber device (preferably, via the subscriber device's web browser), respectively, when a user desires to enroll with the service provider 100 for the receipt of computing services or when a subscriber desires to modify his/her subscriber information previously collected and stored by the host server 104.

The first subscriber enrollment window 400 displays the subscriber's then present virtual non-volatile storage configuration information (and, hence, the configuration parameters thereof) as a plurality of configuration options 402 corresponding to the above-described configuration parameters. The configuration options 402 are selectable by a user/subscriber (e.g., via the subscriber's device) from window 400 to allow the user/subscriber to configure or reconfigure the subscriber's virtual non-volatile storage 108 and the maintenance thereof. The configuration options 402 are grouped in, preferably, five difference groups 404 comprising, without limitation: a virtual non-volatile storage capacity group 404A; an operating system group 404B; an applications group 404C; an update group 404D; and, a backup group 404E.

The virtual non-volatile storage capacity group 404A corresponds to the storage capacity configuration parameter and includes subscriber-selectable configuration options 402 (i.e., radio button controls associated with different numbers of bytes) for the subscriber to select from in order to specify the storage capacity, or size, of the subscriber's virtual non-volatile storage 108. The operating system group 404B corresponds to the operating system identifier configuration parameter and includes subscriber-selectable configuration options 402 (i.e., radio button controls associated with different operating systems) for the subscriber to select from to specify the operating system to be loaded into the subscriber's virtual non-volatile storage 108 by the host server 104 and executed by the host server 104 when the subscriber accesses or utilizes his/her virtual non-volatile storage 108. The applications group 404C corresponds to the one or more application identifier configuration parameters and includes subscriber-selectable configuration options 402 (i.e., check boxes associated with different application programs) for the subscriber to select from in order to specify the one or more application(s) to be loaded into the subscriber's virtual non-volatile storage 108 by the host server 104 and executed by the host server 104, at the subscriber's direction, when the subscriber accesses or utilizes his/her virtual non-volatile storage 108. The update group 404D corresponds to the operating system patch update identifier, the operating system new version update identifier, the application patch update identifier, and the application new version update identifier configuration parameters and includes subscriber-selectable configuration options 402 (i.e., check boxes) uniquely associated with each that enables the subscriber to specify whether he/she desires to have the host server 104 automatically update the operating system and/or application(s) loaded into the subscriber's virtual non-volatile storage 108 by the host server 104 when patches and/or new versions become available. The backup group 404E corresponds to the nightly backup identifier and the weekly backup identifier configuration parameters and includes uniquely associated subscriber-selectable configuration options 402 (i.e., check boxes) for the subscriber to select from in order to specify whether the subscriber desires for his/her virtual non-volatile storage 108 to be backed up by the host server 104 on a nightly basis, on a weekly basis, or not at all.

The first subscriber enrollment window 400 also includes a subscription fee control 406 that displays the present subscription fee associated with the configuration of the subscriber's virtual non-volatile storage 108 specified by the subscriber via the selected configuration options 402 described above. Additionally, the first subscriber enrollment window 400 includes an "Ok" button 408 that enables a subscriber to accept the selected configuration options 402 (and, hence, the configuration information associated therewith), and a "Cancel" button 410 that enables a subscriber to exit the window 400 without accepting the presently selected configuration options 402.

The second subscriber enrollment window 500 (see FIG. 5) displays the subscriber's then present personal and billing information, respectively, through first and second groups 502, 504 of edit control boxes 506, and enables a user/subscriber to enter and edit the personal and billing information. More particularly, the first group 502 of edit control boxes 506, preferably, includes edit control boxes 506 for the input and editing of personal information such as: the subscriber's name, the subscriber's address, a subscriber telephone number, a subscriber electronic mail address, and a subscriber username and password. The second group 504 of edit control boxes 506, preferably, includes edit control boxes 506 for the input and editing of billing information such as: the name, address, telephone number, electronic mail address of the party who is to make payment of the subscription fee; and, a credit card number and associated expiration date against which such payment is to be debited by the service provider 100. Also, the second subscriber enrollment window 500 includes an "Ok" button 508 that enables a subscriber to accept the input, or edited, personal and billing information, and a "Cancel" button 510 that enables a subscriber to exit the window 500 without accepting the presently input, or edited, personal and billing information.

Referring back to FIG. 3, the subscriber enrollment program 304A is connected to the host server operating system 302 via an interprocess communication link 308 for the bi-directional communication of data therewith and to the subscriber information database 306 for the bi-directional communication of subscriber information therebetween. The subscriber information database 306 stores the subscriber information received from a subscriber via the subscriber enrollment program 304A and the first and second subscriber enrollment windows 400, 500 thereof. The subscriber information database 306 also stores information identifying the location of the subscriber's virtual non-volatile storage 108.

A second computer software program 304B, referred to herein as a virtual non-volatile storage interface program 304B, is operable to enable a subscriber to access and utilize his/her virtual non-volatile storage 108 in accordance with a method 1100 for enabling access to and use of a subscriber's virtual non-volatile storage 108 described below. The virtual non-volatile storage interface program 304B is connected to the host server operating system 302, via interprocess communication link 308, for the bi-directional communication of data therebetween, to the subscriber information database 306 for the retrieval and use of subscriber information stored therein, and to the virtual non-volatile storage 106. The virtual non-volatile storage interface program 304B is, preferably, adapted to cause a host server 104 to: establish a communication session with a subscriber device of a subscriber desiring to access and utilize his/her virtual non-volatile storage 108; to execute the operating system 302 stored in the subscriber's virtual non-volatile storage 108 during the communication session; to cause the display of a subscriber-selected user interface of the subscriber device and interact with the subscriber and subscriber device via such user interface during the communication session; to receive, or upload, data files and/or databases from the subscriber device during the communication session and store such data files and/or databases in the subscriber's virtual non-volatile storage 108; to retrieve data files and/or databases from the subscriber's virtual non-volatile storage 108 and send, or download, such data files and/or databases to the subscriber device during the communication session; and, to execute, at the direction of the subscriber, one or more application(s) 112 stored in the subscriber's virtual non-volatile storage 108 during the communication session.

Figure 6:
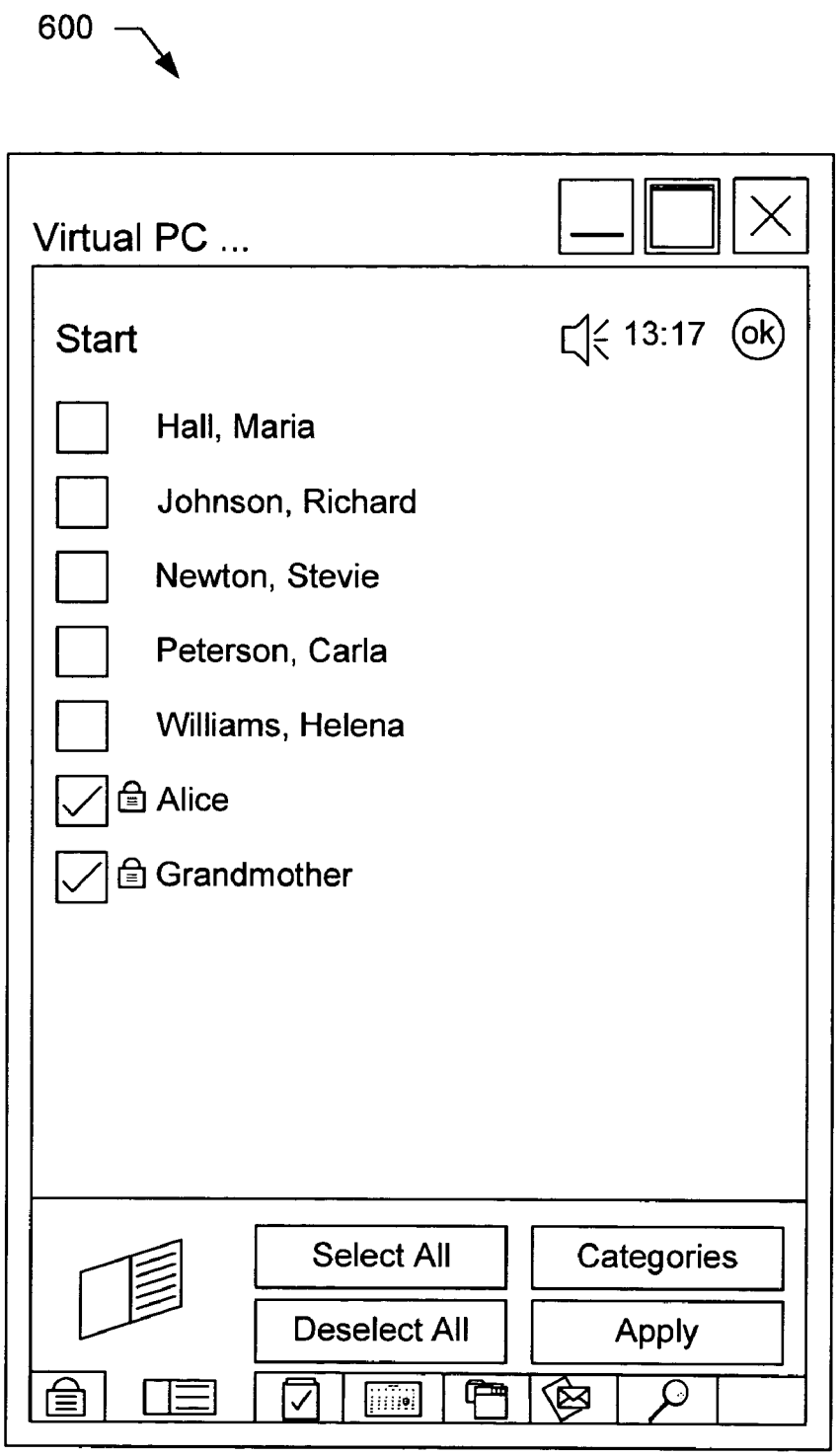
FIG. 6 displays a pictorial representation of a first subscriber-selectable user interface usable by a subscriber to access subscriber virtual non-volatile storage in accordance with the embodiment of the present invention described herein.
Figure 7:
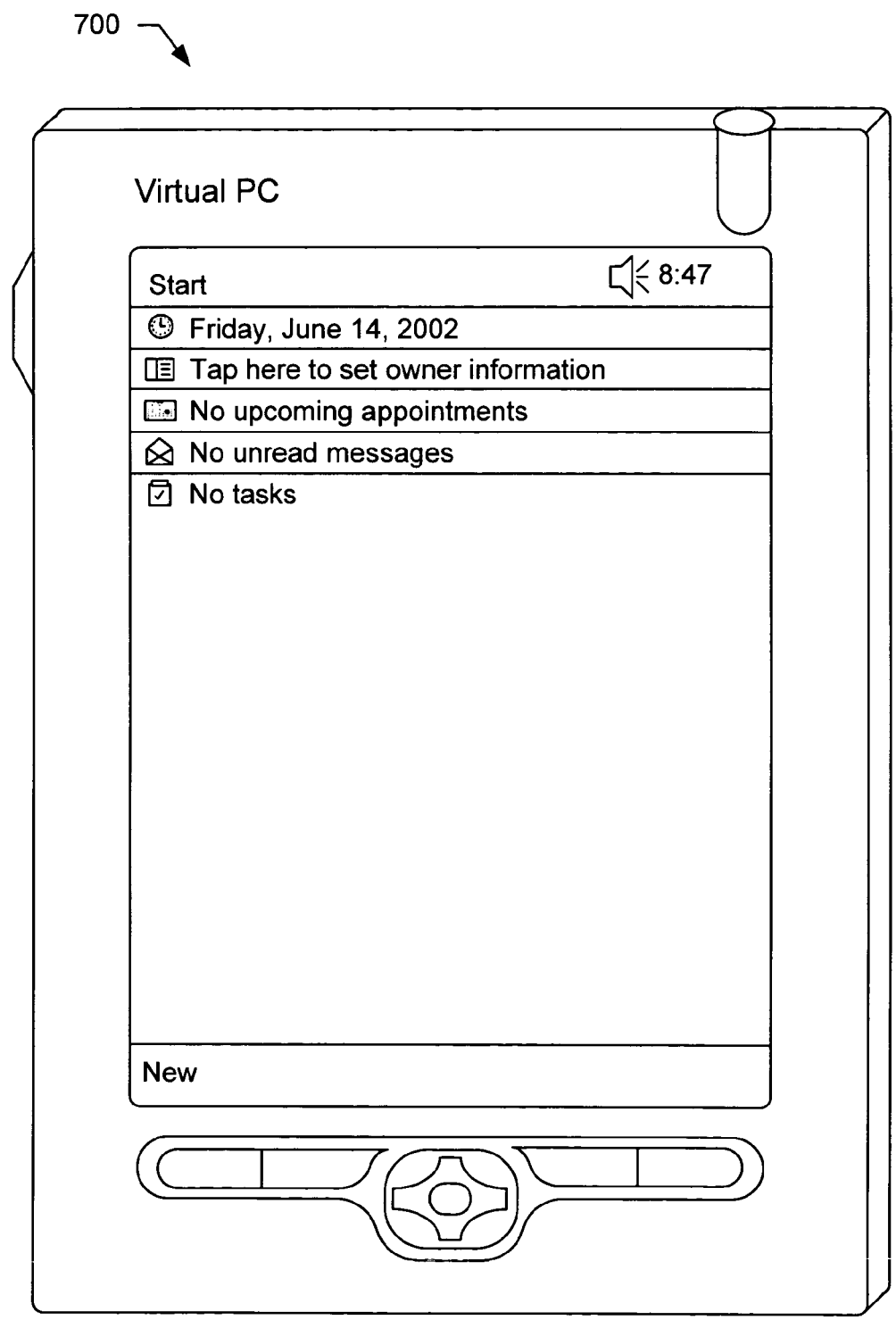
FIG. 7 displays a pictorial representation of a second subscriber-selectable user interface usable by a subscriber to access subscriber virtual non-volatile storage in accordance with the embodiment of the present invention described herein.

By being operable to cause the display of the subscriber-selected user interface on the subscriber device and to interact with the subscriber via such a user interface, the virtual non-volatile storage interface program 304B enables a subscriber to access and utilize his/her virtual non-volatile storage 108 during a communication session through a user interface that the subscriber prefers, regardless of the type of subscriber device being used by the subscriber. Therefore, if the subscriber normally accesses his/her virtual non-volatile storage 108 using a personal digital assistant with a MICROSOFT Windows Mobile™ user interface, but is staying at a hotel having a business center with desktop personal computers which use a traditional MICROSOFT WINDOWS user interface, the subscriber may access his/her virtual non-volatile storage 108 using a desktop personal computer in the business center with the MICROSOFT Windows Mobile™ user interface instead of the MICROSOFT WINDOWS user interface. Alternatively, if the subscriber normally accesses his/her virtual non-volatile storage 108 using a desktop personal computer having a traditional MICROSOFT WINDOWS user interface, but is traveling with personal digital assistant having a MICROSOFT Windows Mobile™ user interface, the subscriber may access his/her virtual non-volatile storage 108 using the personal digital assistant with a traditional MICROSOFT WINDOWS user interface instead of the MICROSOFT Windows Mobile™ user interface. The virtual non-volatile storage interface program 304B is capable of causing the display of plurality of subscriber-selectable user interfaces on a subscriber device and of interacting the subscriber device and a subscriber via such subscriber-selectable user interfaces. The plurality of subscriber-selectable user interfaces include, without limitation, a MICROSOFT WINDOWS user interface 600 (see FIG. 6) and a MICROSOFT Windows Mobile™ user interface 700 (see FIG. 7).

A third computer software program 304C, referred to herein as a subscriber software update and backup program 304C, is operable to automatically cause the update and backup the operating system 110 and application(s) stored in a subscriber's virtual non-volatile storage 108 according to configuration information stored in the subscriber information database 306 and to a method 1200 for updating and backing-up subscribers' virtual non-volatile storage 108 described below. The subscriber software update and backup program 304C is connected to the host server operating system 302, via interprocess communication link 308, for the bi-directional communication of data therebetween, to the subscriber information database 306 for the retrieval and use of subscriber information stored therein, and to the virtual non-volatile storage 106 for the updating and backup of operating systems 110, application(s) 112, and data 114 stored in subscribers' virtual non-volatile storage 108. The subscriber software update and backup program 304C is, preferably, adapted to cause a host server 104 to: retrieve subscription information from the subscriber information database 306 identifying whether a subscriber has configured his/her virtual non-volatile storage 108 for automatic updating of operating system 110 and/or applications 112 when patches and/or new versions become available; automatically update the operating system 110 and/or applications 112 in accordance with the retrieved subscription information when patches and/or new versions become available; retrieve subscription information from the subscriber information database 306 identifying whether a subscriber has configured his/her virtual non-volatile storage 108 for nightly and/or weekly backup of the subscriber's virtual non-volatile storage 108; and, automatically backup the subscriber's virtual non-volatile storage 108 in accordance with the retrieved subscription information.

It should be noted that the subscriber software update and backup program 304C, preferably, hibernates much of the time and is awakened by the host server operating system 302 at appropriate times to perform the subscriber-specified updates and/or backups. Generally, such appropriate times for updates include times when patches or new versions of the subscriber's operating system 110 and/or application(s) 112, as the case may be, are available and host server operation procedures allow. Such appropriate times for nightly and weekly backups, typically, include the nightly and weekly occurring times at which host server operation procedures direct that these backups are to be performed by the host server 104.

A fourth computer software program 304D, referred to herein as a subscriber billing program 304D, is operable to automatically debit the credit cards of subscribers or generate invoices for communication to subscribers for payment of subscription fees associated with the computing services provided to the subscribers by the service provider 100. The subscriber billing program 304D is connected to the host server operating system 302, via interprocess communication link 308, for the bi-directional communication of data therebetween, and to the subscriber information database 306 for the retrieval and use of subscriber information stored therein. The subscriber billing program 304D is, preferably, adapted to cause a host server to: retrieve subscriber information from the subscriber information database 306 identifying the configuration of each subscriber's virtual non-volatile storage 108 as selected by the subscribers; calculate the subscription fees due from respective subscribers based upon the retrieved subscriber information; and, automatically debit the credit cards of subscribers (using the credit card numbers and expiration dates of the billing information portion of the retrieved subscriber information) or produce invoices for delivery to subscribers (using the names and addresses of the billing information portion of the retrieved subscriber information) for the calculated subscription fee amounts.

As described above, subscribers may utilize a plurality of different types of subscriber devices to access and utilize their virtual non-volatile storage 108 in accordance with different scenarios. Nonetheless, the subscriber devices of each particular type, preferably, comprise hardware components similar to those of the computer system 210 described above with reference to FIG. 2. However, the subscriber devices further comprise a plurality of software components which may differ for each type of subscriber device depending on the relative robustness of each type of subscriber device and on the manner in which subscribers use their subscriber devices.

Figure 8:
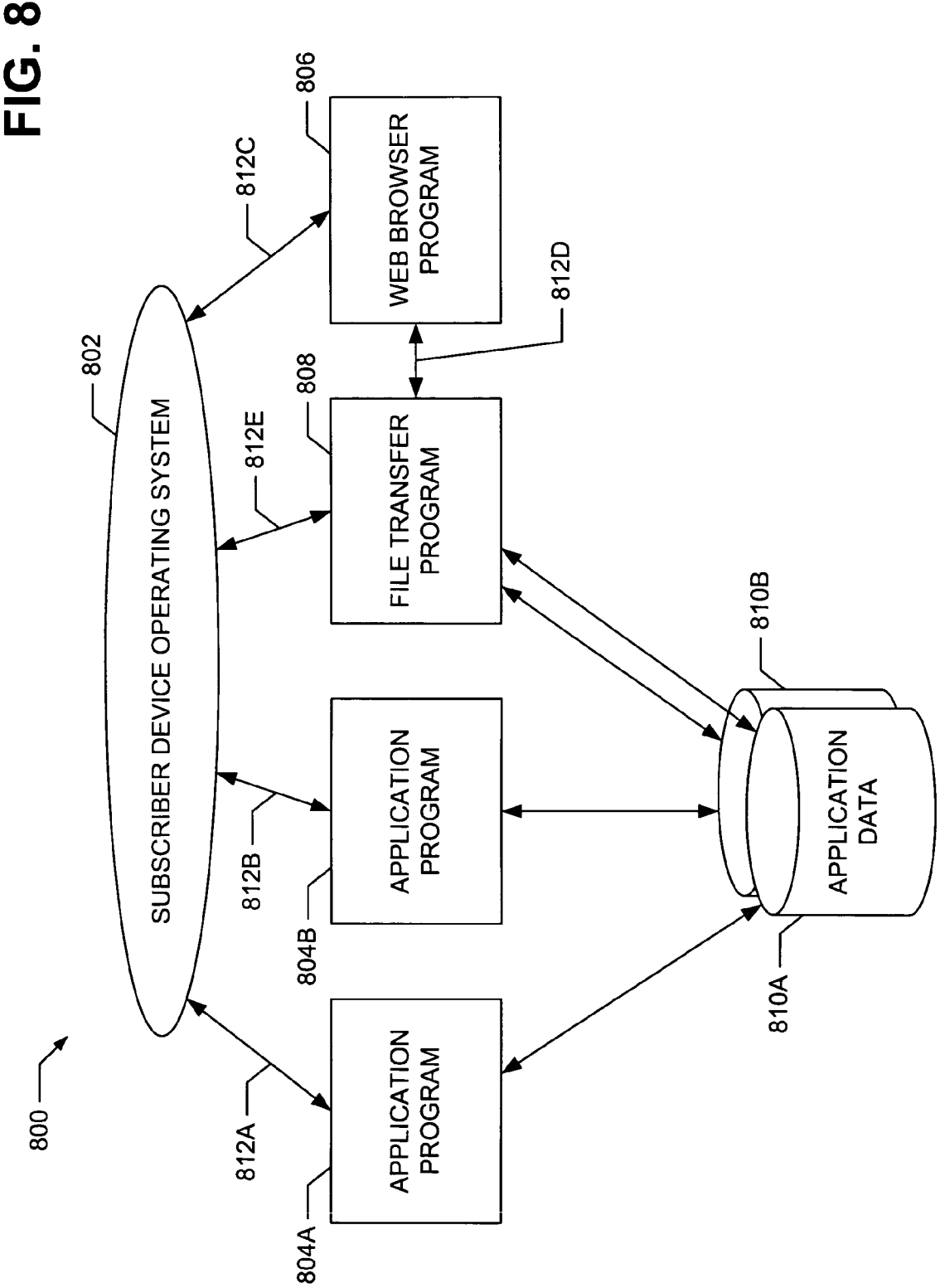
FIG. 8 displays a block diagram representation of exemplary software components of a subscriber device utilized by a subscriber in accordance with the embodiment of the present invention described herein.

FIG. 8 displays a block diagram representation of exemplary software components 800 of a subscriber device utilized by a subscriber according to the third scenario described above. The software components 800 comprise a subscriber device operating system 802, a plurality of application programs 804, a web browser program 806, a file transfer program 808, and a plurality of application data files 810 which reside and are stored in the non-volatile memory of the subscriber device. The subscriber operating system 802 includes a plurality of computer executable software instructions which, when executed by the subscriber devices processing unit, enables the subscriber device to perform basic functions necessary for the overall management and control of the subscriber device's operation. Such basic functions, preferably, include managing the execution of application programs 804, enabling the storage and retrieval of data from data files and/or databases, displaying a user interface and enabling subscriber interaction therewith, and directing the communication of data between processes and with communication network 116. A subscriber device operating system 802, acceptable in accordance with the embodiment of the present invention described herein, is MICROSOFT WINDOWS XP Home Edition available from Microsoft Corporation of Redmond, Washington. Similarly, the application programs 804, web browser 806, file transfer program 808 each include a plurality of computer executable software instructions which, when executed by the subscriber devices' processing unit, cause the subscriber device to provide the respective functions thereof to the subscriber.

The application programs 804A, 804B are connected to the subscriber device operating system 802, via interprocess communication links 812A, 812B, for the bi-directional communication of data therebetween and to the application data files 810A and databases 810B for the storage of application data therein and the retrieval of application data therefrom. Preferably, the application programs 804A, 804B are adapted to cause a subscriber device to perform word processing, spreadsheet processing, contact management, electronic mail communication, database management, and other similar functions. Exemplary application programs 804 include, without limitation, MICROSOFT WORD, MICROSOFT EXCEL, MICROSOFT OUTLOOK, and MICROSOFT ACCESS available from Microsoft Corporation of Redmond, Wash. Application data files 810A and databases 810B store word processing documents, spreadsheets, contact information, electronic mail messages, and other types of data created or manipulated by the application programs 804A, 804B.

The web browser program 806 enables a subscriber device to communicatively connect to a host server 104 on which a subscriber's virtual non-volatile storage 108 resides and to access and utilize application(s) and data stored herein. The web browser program 806 is connected to the subscriber device operating system 802 and to the file transfer program 808, via interprocess communication links 812C, 812D, for the bi-directional communication of data therebetween. The web browser program 806 is, preferably, adapted to cause a subscriber device to: establish a communication session with the host server 104 on which a subscriber's virtual non-volatile storage 108 resides; display a user interface selected by the subscriber and generated by virtual non-volatile storage interface program 304B of the host server 104; receive subscriber input information via such user interface and communicate such information to the virtual non-volatile storage interface program 304B of the host server 104; receive subscriber input information via such user interface and communicate such information to the virtual non-volatile storage interface program 304B of the host server 104; receive information from the host server 104 and provide such information to the subscriber via such user interface; enable access and use of the subscriber's virtual non-volatile storage 108 via such user interface; and, control the uploading and downloading of data files 810A and databases 810B to/from the subscriber's virtual non-volatile storage 108 using the file transfer program 808. An exemplary web browser program 806, acceptable in accordance with the embodiment described herein, is MICROSOFT Internet Explorer available from Microsoft Corporation of Redmond, Wash.

The file transfer program 808 allows a subscriber device to upload data files 810A and databases 810B stored thereon to a subscriber's virtual non-volatile storage 108 and to download data files 810A and databases 810B stored in the subscriber's virtual non-volatile storage 108 to the subscriber service. The file transfer program 808 is connected to the subscriber device operating system 802 and to the web browser program 806, via respective interprocess communication links 812E, 812D, for the bi-directional communication of data therebetween. The file transfer program 808 is, preferably, adapted to cause the subscriber device, acting in cooperation with the web browser program 806, to: upload a data file 810A or database 810B from the subscribers device to the subscriber's virtual non-volatile storage 108; and, download a data file 810A or database 810B from the subscriber's virtual non-volatile storage 108 to the subscriber device. An exemplary file transfer program 808 includes the "ftp" file transfer program.

Figure 9:
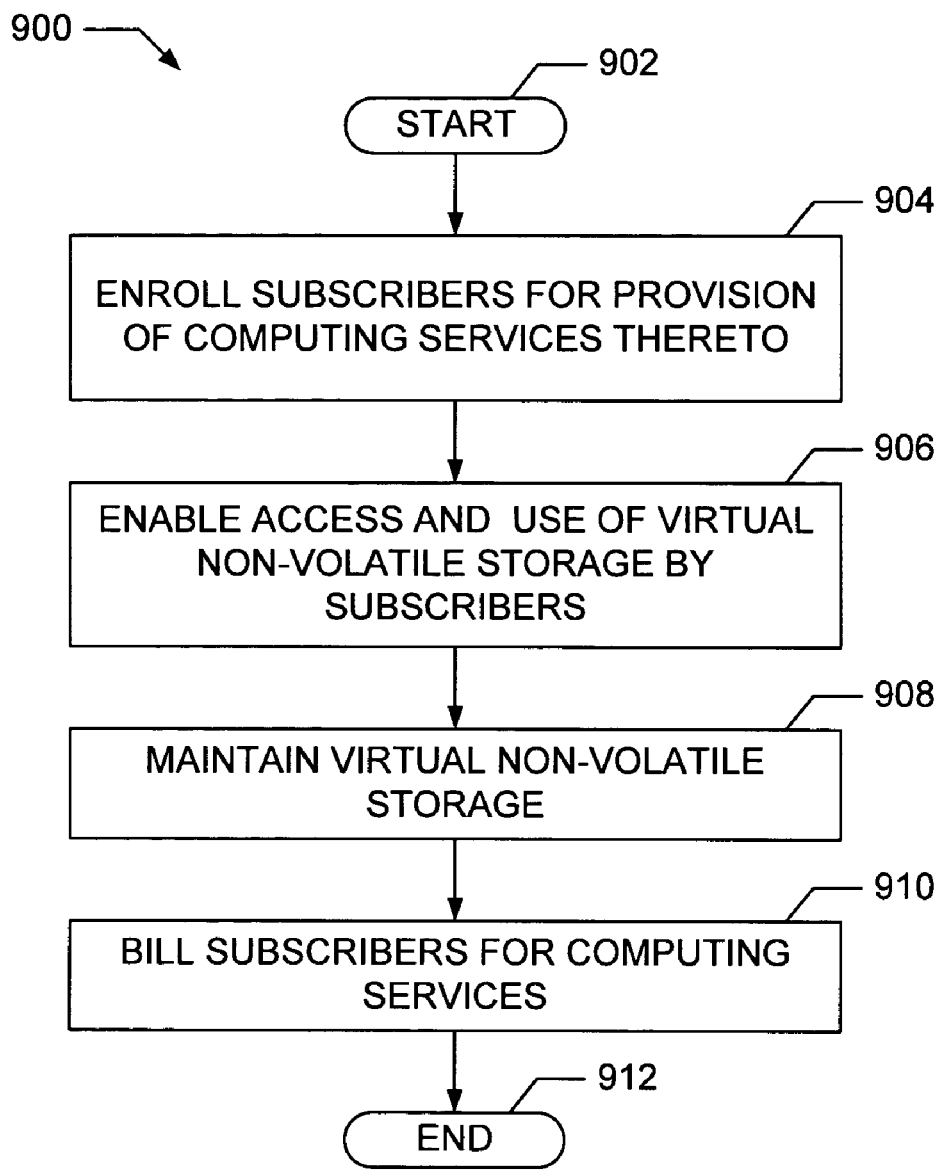
FIG. 9 displays a flowchart representation of a method of operating a subscription-based virtual personal computing service provider in accordance with the embodiment of the present invention described herein.

FIG. 9 displays a flowchart representation of a method 900 of operating a subscription-based virtual personal computing service provider 100, in accordance with the embodiment of the present invention described herein. After starting at step 902, the method 900 advances to step 904 where the service provider 100 enrolls new subscribers for the provision of the above-described subscriber-configurable computing services thereto in exchange for the agreement of the subscribers to pay a subscription fee based, at least in part, on the computing services that the subscribers select and receive from the service provider 100. In order to enroll new subscribers, the service provider 100, preferably, hosts a website on a host server 104 which is operable to display information about the service provider's subscriber-configurable computing services when accessed by a potential subscriber. The website, preferably, has an enrollment option that is selectable by a potential subscriber. Upon selection of the enrollment option by a potential subscriber, the host server 104 initiates execution of the subscriber enrollment program 304A which uses the method 1000 for enrolling subscribers described below with reference to FIGS. 10A and 10B to enroll the potential subscriber as a subscriber.

After enrolling subscribers, the method 900 advances to step 906 where the service provider 100, via a host server 104, enables subscribers to access and use their respective virtual non-volatile storage 108. Preferably, the service provider's website includes an access option that is selectable by a subscriber. Upon selection of the access option by a subscriber, the host server 104 initiates execution of the virtual non-volatile storage interface program 304B which uses the method 1100 for enabling access to and use of a subscriber's virtual non-volatile storage 108, described below with reference to FIG. 11, to cause the host server 104 to establish a communication session with the subscriber device and to cause the display of a subscriber-selectable user interface on the subscriber device. During such communication session and via selections made by the subscriber from the user interface, the subscriber may: upload data files 810A or databases 810B from the subscriber device to the subscriber's virtual non-volatile storage 108; download data files 114A or databases 114B from the subscriber's virtual non-volatile storage 108 to the subscriber device 142; run application(s) 112 stored in the subscriber's virtual non-volatile storage 108 using the processing unit and other hardware components of the host server 104; or, select a different user interface for display on the subscriber device. When the subscriber has completed use of his/her virtual non-volatile storage 108, the subscriber closes the user interface to exit the communication session with the host server 104.

Next, at step 908, the service provider 100 maintains subscribers' virtual non-volatile storage 108 by performing (i) updates to operating systems and applications and (ii) backups of the contents of the subscribers' virtual non-volatile storage 108, for subscribers' virtual non-volatile storage 108 that have been allocated to subscribers who have opted to be provided with computing services by the service provider 100 that include updates to operating systems and/or applications, and backups on a nightly or weekly basis of their subscriber virtual non-volatile storage 108. Preferably, updates of operating systems and applications are performed only when such updates are available and only for those subscribers who have configured their respective subscriber virtual non-volatile storage 108 to receive patch updates and/or new version updates. Similarly, backups of subscribers' virtual non-volatile storage 108 are performed only for those subscribers who have configured their respective subscriber virtual non-volatile storage 108 to be backed up on a nightly or weekly basis. Such backups are, typically, performed during the early morning hours when subscribers are less likely to be using their virtual non-volatile storage 108 with nightly backups being performed every night and weekly backups being performed only once per week. The performance of updates and backups is accomplished or initiated by the service provider 100 through a host server's execution of the subscriber software update and backup program 304C which uses the method 1200 for updating and backing-up virtual non-volatile storage 108 described below with reference to FIG. 1200. Preferably, the subscriber software update and backup program 304C hibernates to the extent possible and is awakened by the host server operating system 302, at an appropriate time, for execution.

Then, at step 910, the service provider 100 bills subscribers a subscription fee for the computing services which have been provided to them. The subscription fee for a particular subscriber is computed based, at least, on the configuration information for that subscriber's virtual non-volatile storage 108. Therefore, subscribers who have configured their virtual non-volatile storage 108 to receive increased computing services as compared to other subscribers, pay a higher subscription fee than those subscribers who have configured their virtual non-volatile storage 108 to receive fewer computing services. For example, if a subscriber has configured his/her virtual non-volatile storage 108 to have a larger storage capacity than the virtual non-volatile storage 108 of other subscribers, the subscription fee for such subscriber is higher than that for such other subscribers with all other configuration parameters being the same. Similarly, if a subscriber has configured his/her virtual non-volatile storage 108 for the automatic updating of applications with patches and new versions thereof and other subscribers have not, the subscription fee for such subscriber is higher than that for such other subscribers with all other configuration parameters being the same. Preferably, the service provider 100 bills subscribers for their respective subscription fees on a monthly basis, but other periods of time between billings are acceptable as well. Also preferably, the service provider 100 bills the subscription fees to subscribers by debiting their respective credit cards for such amounts, but may generate and send invoices to subscribers if desired. The billing of subscribers by the service provider 100 is, preferably, performed through a host server's execution of the subscriber billing program 304D which is described above with respect to FIG. 3. Once billing has been performed, the method 900 ends at step 912.

Figure 10A:
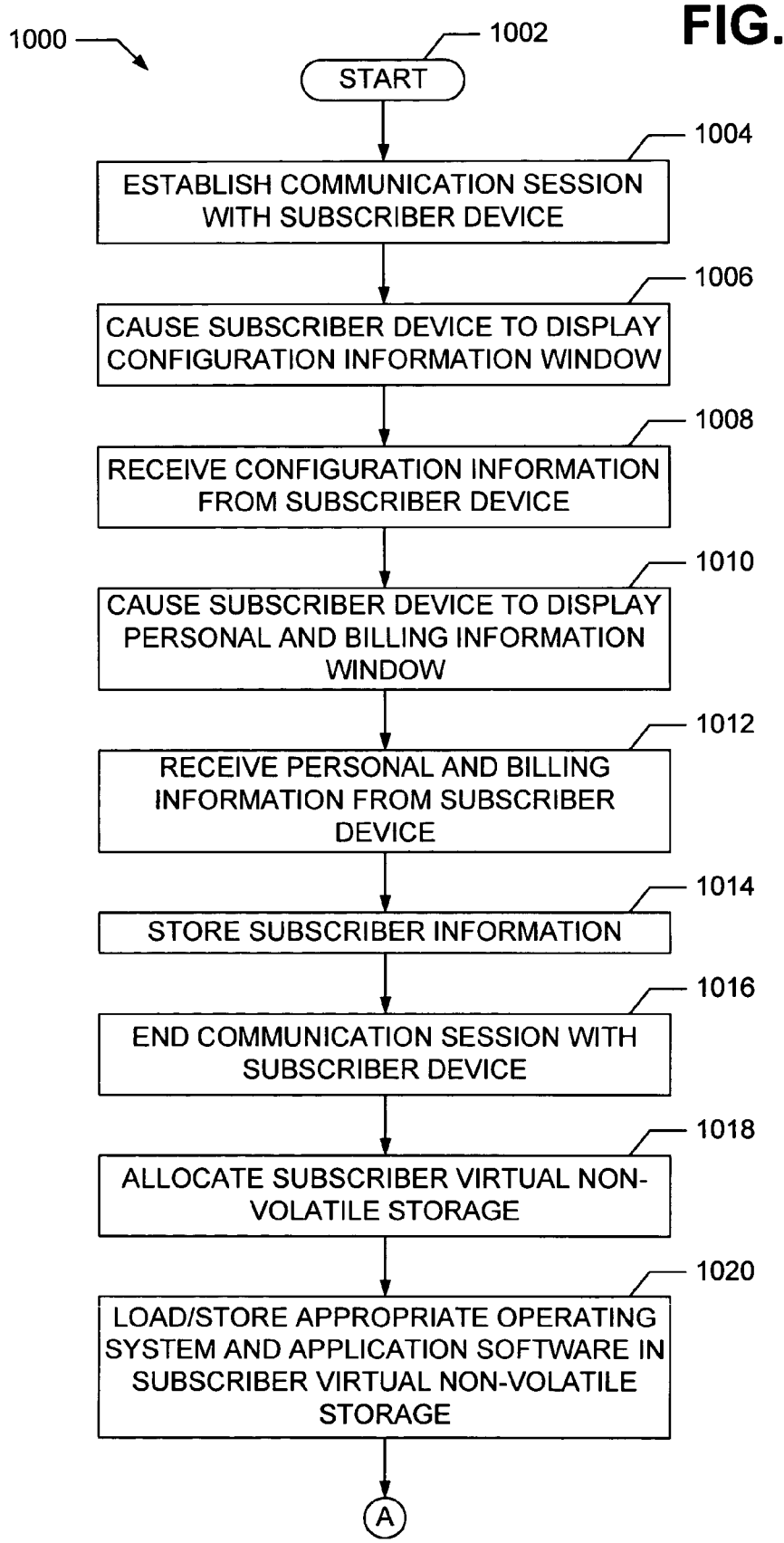

FIGS. 10A and 10B display a flowchart representation of a method 1000 for enrolling subscribers in accordance with the embodiment of the present invention described herein. After starting at step 1002, method 1000 proceeds to step 1004 where a host server 104 of the service provider 100 establishes a communication session with a potential subscriber device in response to the potential subscriber selecting an enrollment option from a service provider website. Next, at step 1006, the host server 104 causes the display of the first subscriber enrollment window 400 (also sometimes referred to herein as the "configuration information window 400") (see FIG. 4) on the potential subscriber device. Preferably, the configuration information window 400 is in the form of an XML data file and the host server 104 causes the display of the configuration information window 400 on the potential subscriber device by communicating the XML data file to the potential subscriber device. Then, the potential subscriber inputs configuration information to the configuration information window 400 in order to configure his/her virtual non-volatile storage 108. Once the potential subscriber has defined his/her virtual non-volatile storage 108 and has selected the "Ok" button, the host server 104, at step 1008, receives the potential subscriber's configuration information inputs from the potential subscriber device.

Continuing at step 1010, the host server 104 causes the display of the second subscriber enrollment window 500 (also sometimes referred to herein as the "personal and billing information window 500") (see FIG. 5) on the potential subscriber device. Similar to the configuration information window 400, the personal and billing information window 500 is, preferably, in the form of the XML data file and the host server 104 causes the display of the personal and billing information window 500 on the potential subscriber device by communicating the XML data file to the potential subscriber device. Once the personal and billing information window 500 is displayed, the potential subscriber inputs his/her personal information and billing information to the window 500. After the potential subscriber has input his/her personal and billing information and has selected the "Ok" button, the host server 104, at step 1012, receives the potential subscriber's personal and billing information inputs from the potential subscriber device. Then, the host server 104 stores the subscriber information in the subscriber information database 306 at step 1014 and ends the communication session with the potential subscriber at step 1016. After storing of the subscriber information, the potential subscriber may be referred to as a subscriber.

Proceeding to step 1018 of method 1000, the host server 104 allocates the subscriber's virtual non-volatile storage 108 from non-volatile storage 106 present in a non-volatile memory of, or accessible to, the host server 104. In order to do so, the host server 104 uses configuration information received at step 1008 to determine the storage capacity selected by the potential subscriber from the options present on the configuration information window 400. The host server 104 then assigns a portion 108 of non-volatile storage 106 in such a storage capacity to the subscriber (i.e., the subscriber's virtual non-volatile storage 108) and updates the subscriber information stored in the subscriber information database 306 for the subscriber with data identifying and pointing to the location of the allocated subscriber's virtual non-volatile storage 108.

Once the host server 104 has allocated the subscriber's virtual non-volatile storage 108, the host server 104, at step 1020, installs, loads, and stores in the subscriber's virtual non-volatile storage 108, the operating system and application(s), if any, which were specified by the subscriber in the configuration information received at step 1008. If the subscriber has not specified an operating system, then no operating system is installed, loaded or stored in the subscriber's virtual non-volatile storage 108. Similarly, if the subscriber has not specified any applications, then no applications are installed, loaded, or stored in the subscriber's virtual non-volatile storage 108. Next, the host server 104 notifies the subscriber that his/her virtual non-volatile storage 108 is ready for use at step 1022 and terminates operation in accordance with method 1000 at step 1024.

Figure 11B:
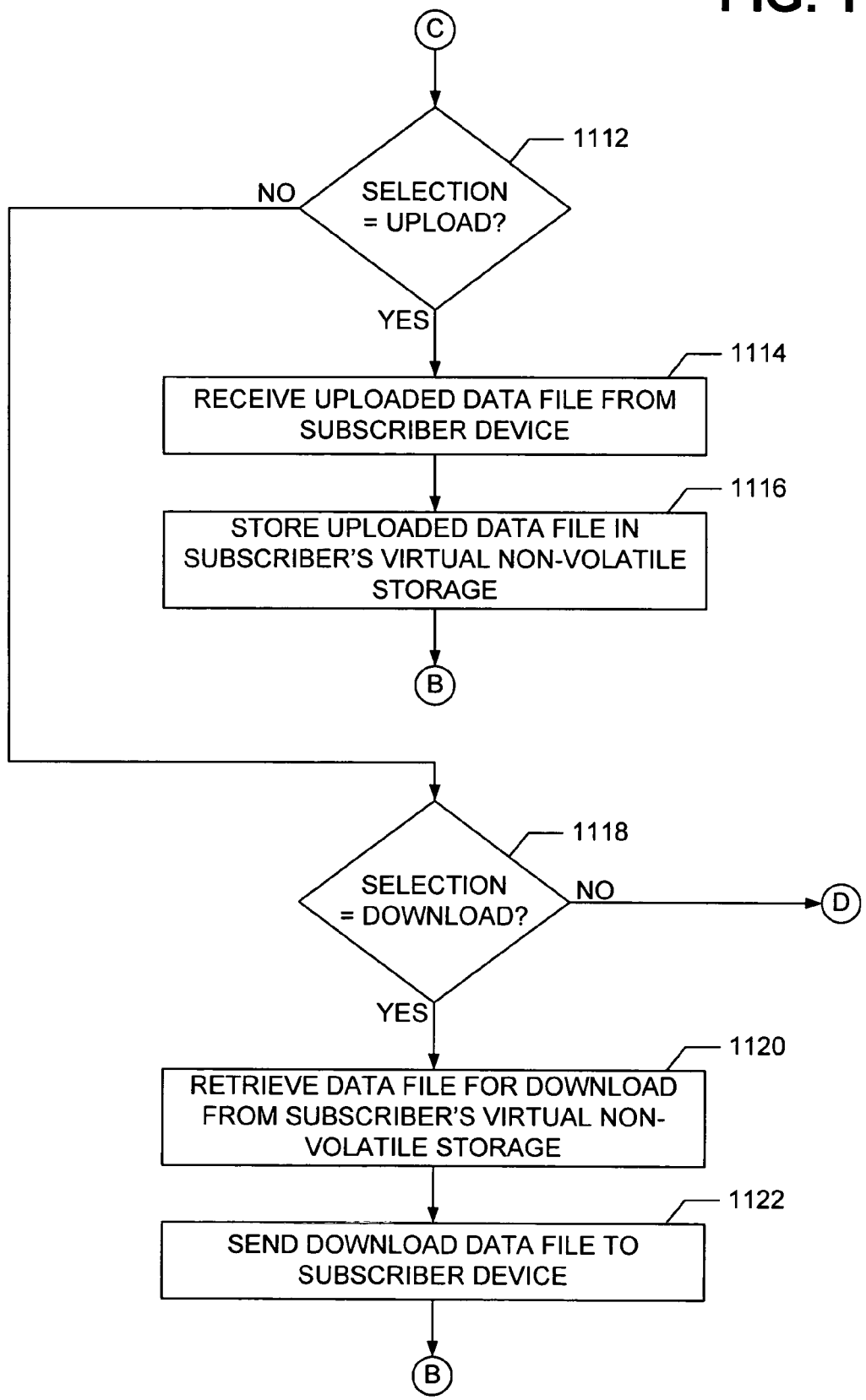
Figure 11C:
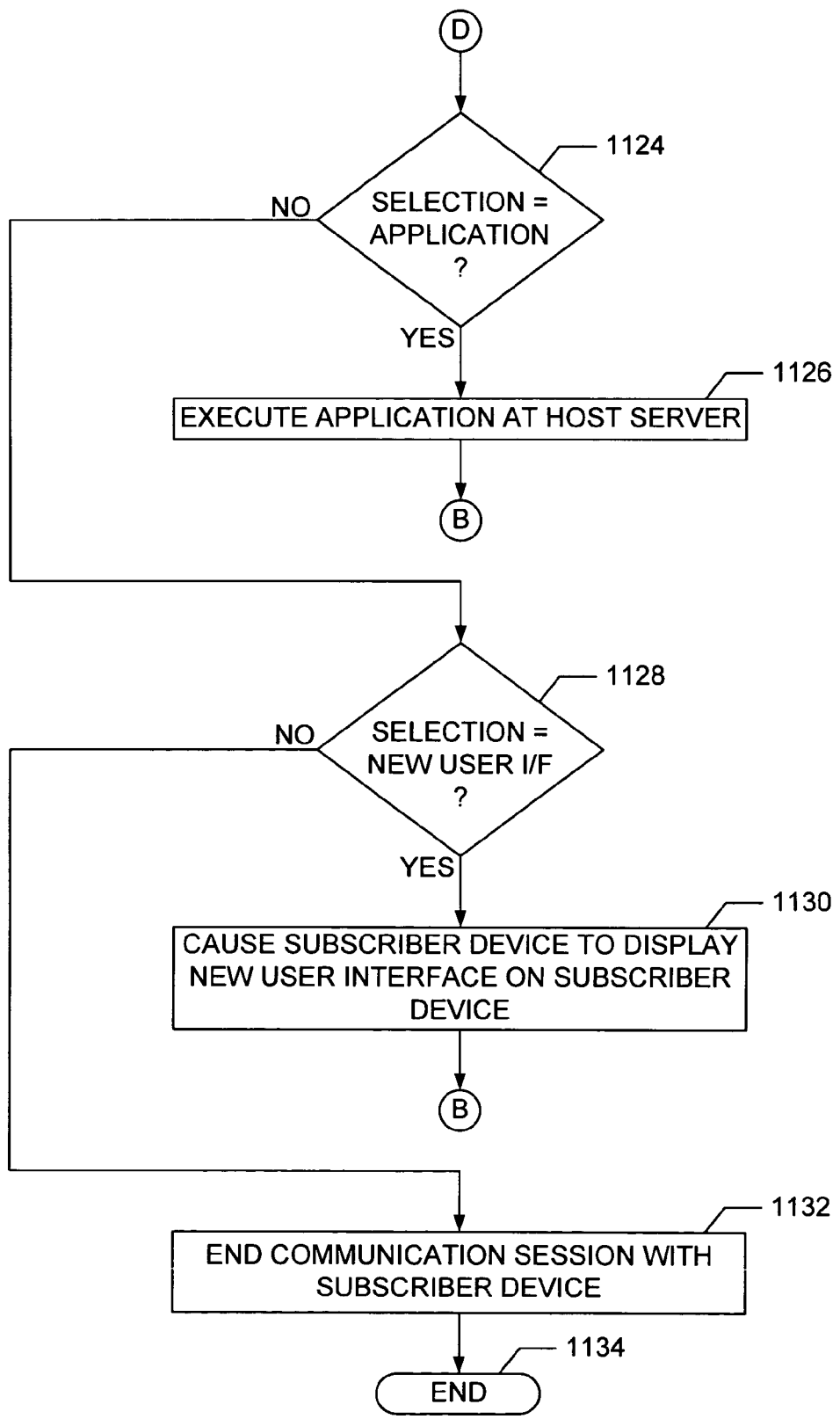

FIGS. 11A-11C display a flowchart representation of a method 1100 for enabling access to and use of a subscriber's virtual non-volatile storage 108 according to the embodiment of the present invention described herein. After starting at step 1102, the method advances to step 1104 where the host server 104 establishes a communication session with a subscriber device. The communication session is established, preferably, in response to a subscriber selecting an access option on a service provider website. During the establishment of such communication session, the host server 104, preferably, receives data from the subscriber device identifying the type of the subscriber device 108 or identifying the user interface preferred by the subscriber for use in accessing and using his/her virtual non-volatile storage 108. If the host server 104 receives only data identifying the type of the subscriber device 108, the host server 104 uses such data to determine, at step 1106, the user interface (e.g., the MICROSOFT WINDOWS user interface, the MICROSOFT Windows Mobile™ user interface, or another user interface) to be displayed on the subscriber device and used by the subscriber to access and use his/her virtual non-volatile storage 108. Otherwise, the host server 104 uses the data identifying the subscriber's preferred user interface and no such determination is necessary. Regardless of how the host server 104 decides on a user interface to display, the host server 104 causes the subscriber device to display the user interface thereon at step 1108.

Proceeding to step 100 of method 1100, the host server 104 waits for and receives, from the subscriber device via the user interface, a selection by the subscriber of a user interface control or option indicating that the subscriber desires to upload a file, download a file, execute an application, or request a change to another user interface. The host server 104 then considers the received selection, at step 1112, to determine whether the subscriber desires to upload a file. If not, the host server 104 branches forward to step 1118 of method 1100 described below. If so, the host server 104 receives the uploaded data file from the subscriber device at step 1114 and stores the uploaded data file in the subscriber's virtual non-volatile storage 108 at step 1116. Once the uploaded data file is stored, the host server 104 returns to step 1110 where it again waits for a subscriber selection.

At step 1118, the host server 104 considers the received selection to ascertain whether the subscriber desires to download an identified file. If the host server 104 ascertains that the subscriber does not desire to download a file, the host server 104 advances to step 1124 of method 1100 described below. Alternatively, if the host server 104 ascertains that the subscriber desires to download an identified file, the host server 104 retrieves the identified data file from the subscriber's virtual non-volatile storage 108 at step 1120 and sends, or communicates, the retrieved data file to the subscriber device at step 1122. After the download is complete, the host server 104 loops back to step 1110 of method 1100 to await another subscriber selection.

At step 1124, the host server 104 considers the selection received at step 1110 to decide whether it indicates that the subscriber desires to run, or execute, an application stored in the subscriber's virtual non-volatile storage 108. If the host server 104 decides that the selection does not indicate a desire to run an application, the host server 104 branches ahead to step 1128 of the method 110 described below. If, however, the host server 104 decides that the selection indicates that the subscriber desires to run an application identified with the selection, the host sever 104 executes the identified application from the subscriber's virtual non-volatile storage 108 at the host server 104 at step 1126 and communicates inputs and outputs therefore with the subscriber device via the user interface. Upon completing execution of the application, the host server 104 branches back to step 1110 to wait for another selection from the subscriber.

At step 1128, the host server 104 determines whether the selection received at step 1110 signifies that the subscriber desires to change to an identified user interface. If not, the host server 104 branches forward to step 1132 described below. If so, the host server 104 causes the subscriber device to display the identified user interface thereon at step 1130. Once the identified user interface is displayed, the host server 104 loops back to step 1110 to await receipt of another subscriber selection.

At step 1132, the host server 104 ends the communication session with the subscriber device. Then, at step 1134, the host server 104 terminates operation in accordance with method 1100.

Figure 12B:
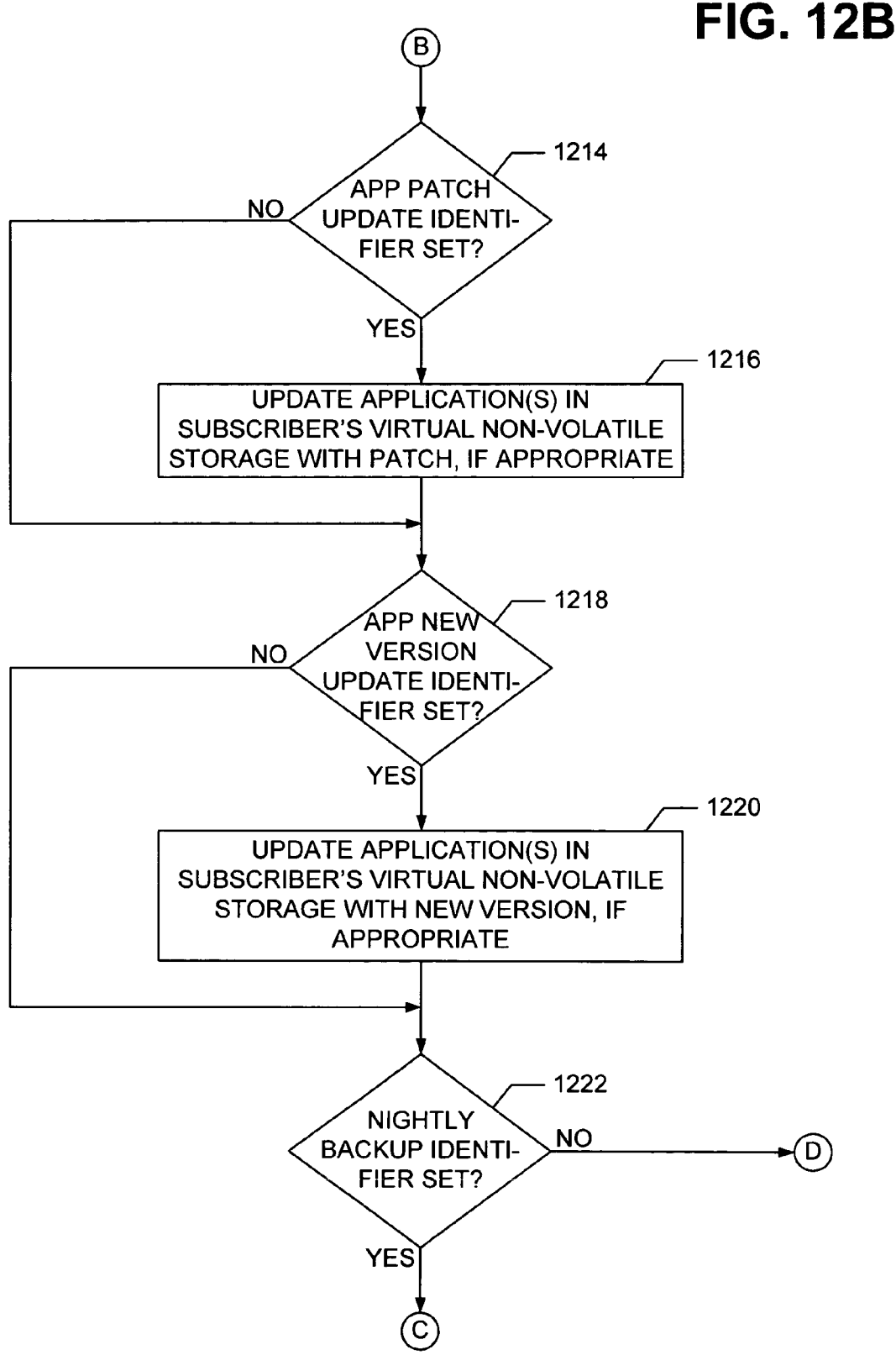
Figure 12C:
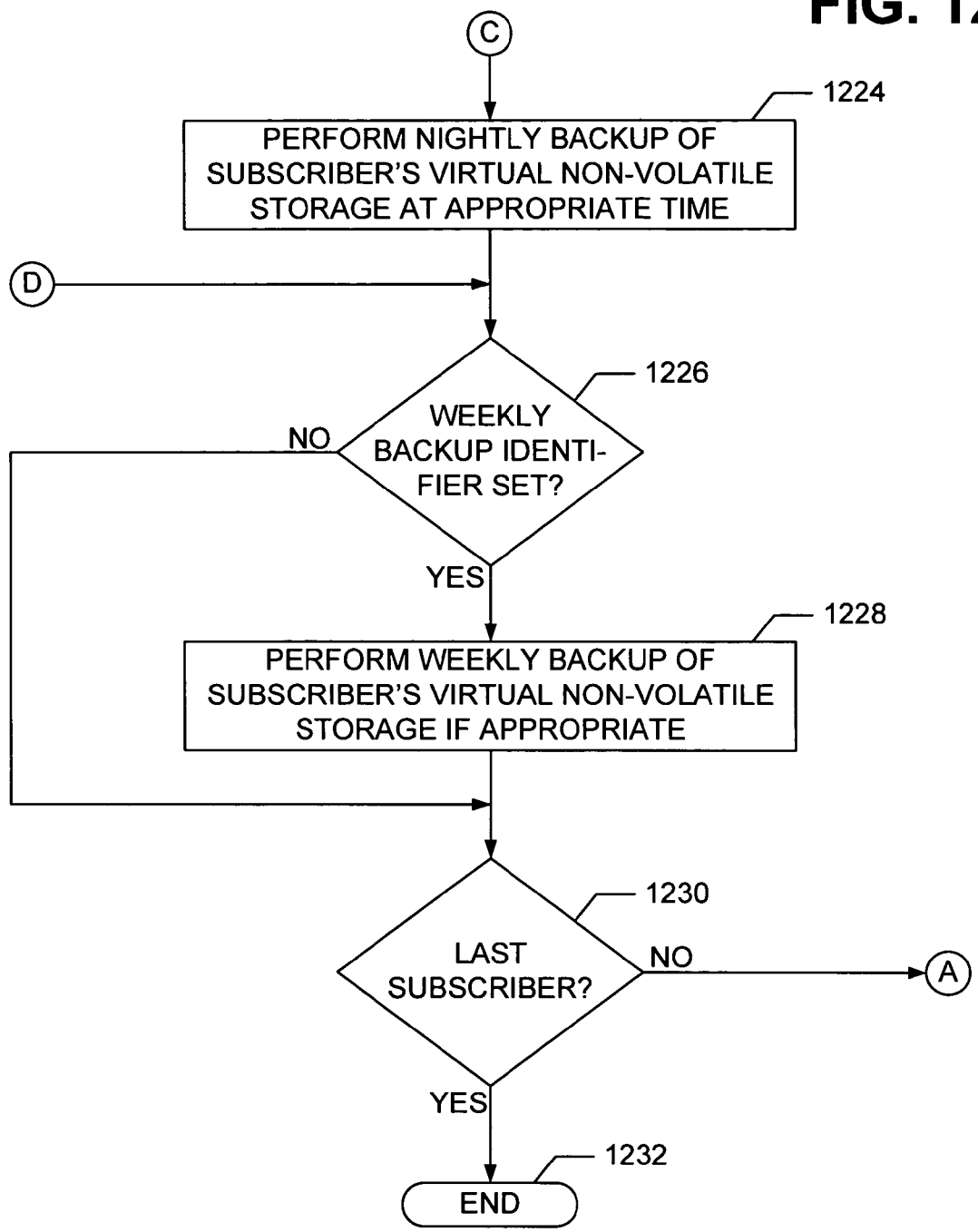

FIGS. 12A-12C display a flowchart representation of a method 1200 for updating and backing-up subscribers' virtual non-volatile storage 108 in accordance with the embodiment of the present invention described herein. After starting at step 1202, the method 1200 advances to step 1204 where the host server 104 retrieves configuration information for the "next" subscriber from the subscriber information database 306. It should be understood that the "next" subscriber, after starting of the method 1200, corresponds to the first subscriber having subscriber information (e.g., virtual non-volatile storage configuration information, personal information, and billing information) stored in the subscriber information database 306. Once the host server 104 has retrieved the configuration information, the host server 104 moves forward to step 1204 of method 1200 where it determines whether the operating system patch update identifier of the retrieved configuration information is set, thereby determining whether the subscriber desires automatic updating of the operating system stored in the subscriber's virtual non-volatile storage 108 with patches, bug fixes, and service packs when they become available. If not, the host server 104 continues operation in accordance with step 1210 described below. If so, at step 1208, the host server 104 determines whether any patches, bug fixes, or service packs are available for the particular operating system present in the subscriber's virtual non-volatile storage 108. If any patches, bug fixes, or service packs are available, the host server 104 applies the patches, bug fixes, or service packs to the operating system.

At step 1210, the host server 104 ascertains whether the operating system new version update identifier of the retrieved configuration information is set, thereby determining whether the subscriber desires automatic updating of the operating system stored in the subscriber's virtual non-volatile storage 108 with new versions when they become available. If automatic updating of the operating system with new versions is not desired, the host server 104 continues operation in accordance with step 1214 described below. If automatic updating of the operating system with new versions is desired, at step 1212, the host server 104 determines whether any new versions are available for the particular operating system present in the subscriber's virtual non-volatile storage 108. If any new versions are available, the host server 104 installs the new versions of the operating system in the subscriber's virtual non-volatile storage 108.

Continuing at step 1214, the host server 104 decides whether the application patch update identifier of the retrieved configuration information is set in order to determine whether the subscriber desires automatic updating of application(s) stored in the subscriber's virtual non-volatile storage 108 with patches, bug fixes, and service packs when they become available. If not, the host server 104 continues operation in accordance with step 1218 described below. If so, at step 1216, the host server 104 determines whether any patches, bug fixes, or service packs are available for the particular application(s) present in the subscriber's virtual non-volatile storage 108 which were installed by the service provider 100. If any patches, bug fixes, or service packs are available for such application(s), the host server 104 applies the patches, bug fixes, or service packs to the application(s).

At step 1218, the host server 104 ascertains whether the application new version update identifier of the retrieved configuration information is set in order to decide whether the subscriber desires automatic updating of the application(s) stored in the subscriber's virtual non-volatile storage 108 with new versions when they become available. If automatic updating of the application(s) with new versions is not desired, the host server 104 branches forward to step 1222 described below. If automatic updating of the application(s) with new versions is desired, at step 1220, the host server 104 determines whether any new versions are available for the particular application(s) present in the subscriber's virtual non-volatile storage 108 which were installed by the service provider 100. If any new versions are available, the host server 104 installs the new versions of the application(s) in the subscriber's virtual non-volatile storage 108.

Next, at step 1222, the host server 104 determines whether the nightly backup identifier of the retrieved configuration information is set. If the nightly backup identifier is set, the subscriber desires for the service provider 100 to backup his/her virtual non-volatile storage 108 on a nightly basis. If the nightly backup identifier is not set, the subscriber does not desire for the service provider 100 to backup his/her virtual non-volatile storage 108 on a nightly basis. Upon determining that the nightly backup identifier is not set, the host server 104 advances to step 1226 described below. Alternatively, upon determining that the nightly backup identifier is set, the host server 104 causes the nightly backup of the subscriber's virtual non-volatile storage 108 to be performed at step 1224. Preferably, the nightly backup is performed on a scheduled basis by an appropriate backup utility that executes at a time when the subscriber is not likely to be using his/her virtual non-volatile storage 108.

Subsequently, at step 1226, the host server 104 decides whether the weekly backup identifier of the retrieved configuration information is set, thereby deciding whether the subscriber desires for the service provider 100 to perform a weekly backup of his/her virtual non-volatile storage 108. If the weekly backup identifier is not set, the host server 104 branches forward to step 1230 described below. If, however, the weekly backup identifier is set, the host server 104 causes, at step 1228, the performance of a weekly backup of the subscriber's virtual non-volatile storage 108 if a week has passed since the last weekly backup thereof. The host server 104 may cause the weekly backup to be performed by scheduling performance of the weekly backup by a backup utility that executes at a time when the subscriber is not likely to be using his/her virtual non-volatile storage 108.

At step 1230, the host server 104 determines whether the configuration information for the last subscriber of the subscriber information database 306 has been processed with respect to updating and backing up of subscribers' virtual non-volatile storage 108. If not, the host server 104 loops back to step 1204 to again retrieve configuration information associated with the next subscriber and to repeat the above-described steps of method 1200 with respect to such retrieved configuration information for the next subscriber. If so, at step 1232, the host server 104 ceases operation in accordance with method 1200.

Whereas the present invention has been described in detail above with respect to an embodiment thereof, it is understood that variations and modifications can be effected within the spirit and scope of the invention, as described herein before and as defined in the appended claims. The corresponding structures, materials, acts, and equivalents of all means-plus-function elements, if any, in the claims below are intended to include any structure, material, or acts for performing the functions in combination with other claimed elements as specifically claimed.

What is claimed is:

1. A method for providing subscription-based virtual computing services to a subscriber, the method comprising the steps of:

enrolling, by a computer system, a subscriber in a subscription-based computing services program for the provision of virtual computing services to the subscriber under the subscription-based computing services program through a virtual non-volatile storage allocated uniquely to the subscriber and accessible to the subscriber via a server computer during a communication session between the server computer and a subscriber device used by the subscriber, the virtual computing services corresponding to configuration options selectable by the subscriber, wherein enrolling by the computer system comprises the steps of receiving selected configuration options from the subscriber via the subscriber device, and configuring the virtual non-volatile storage in accordance with the selected configuration options received from the subscriber;

exposing, by the computer system, a user interface having a plurality of portions selectable by the subscriber to specify the configuration options for the virtual computing services including a least:

a portion selectable to specify a storage capacity of the virtual non-volatile storage from at least two storage capacity options;

a portion selectable to specify an operating system from at least two operating system options, said server computer operable to install a selected operating system to the virtual non-volatile storage to provide the virtual computing services;

a portion selectable to specify an application computer software program that is installable into the virtual non-volatile storage of the subscriber device for execution by the server computer during a subsequent communication session with the subscriber device; and a portion selectable to specify whether the server computer is to update the selected operating system when operating system updates become available;

enabling, by the computer system, access to and use of the virtual non-volatile storage via the server computer during a communication session between the server computer and the subscriber device, wherein the server computer is configured to use information identifying a type of subscriber device to determine a user interface to be displayed on the subscriber device and used by the subscriber to access the virtual non-volitile storage; and charging, by the computer system, the subscriber in accordance with selected configuration options received from the subscriber.

2. The method of claim 1, wherein one of the selected configuration options is indicative of the subscriber's desire to receive a virtual computing service including access to and use of the virtual non-volatile storage during a subsequent communication session with the subscriber, the virtual non-volatile storage having storage capacity selected via the user interface and wherein the step of configuring comprises a step of allocating the virtual non-volatile storage to the subscriber for access and use by the subscriber.

3. The method of claim 1, wherein one of the selected configuration options is indicative of the subscriber's desire to receive a virtual computing service including the use of an operating system selected via the user interface for execution by the server computer during a subsequent communication session with the subscriber, and wherein the step of configuring comprises a step of installing the operating system in the virtual non-volatile storage of the subscriber.

4. The method of claim 1, wherein the step of enrolling, by the computer system, comprises the steps of receiving selected configuration options from the subscriber via the subscriber device, wherein one of the selected configuration options is indicative of the subscriber's desire to receive a virtual computing service including automatic updating of an operating system selected via the user interface and stored in the virtual non-volatile storage of the subscriber with patches therefor, and wherein the method further comprises a step of automatically updating the operating system computer stored in the virtual non-volatile storage of the subscriber with patches therefor.

5. The method of claim 1, wherein the step of enrolling, by the computer system, comprises the steps of receiving selected configuration options from the subscriber via the subscriber device, wherein one of the selected configuration options is indicative of the subscriber's desire to receive a virtual computing service including a automatic updating of an operating system selected via the user interface and stored in the virtual non-volatile storage of the subscriber with new versions thereof, and wherein the method further comprises a step of automatically updating the operating system computer software program stored in the virtual non-volatile storage of the subscriber with new versions thereof.

6. The method of claim 1, wherein the step of enrolling, by the computer system, comprises the steps of receiving selected configuration options from the subscriber via the subscriber device, wherein one of the selected configuration options is indicative of the subscriber's desire to receive a virtual computing service including a automatic updating of an application computer software program stored in the virtual non-volatile storage of the subscriber with patches therefor, and wherein the method further comprises a step of automatically updating the application computer software program stored in the virtual non-volatile storage of the subscriber with patches therefor.

7. The method of claim 1, wherein the step of enrolling, by the computer system, comprises the steps of receiving selected configuration options from the subscriber via the subscriber device, wherein one of the selected configuration options is indicative of the subscriber's desire to receive a virtual computing service including a automatic updating of an application computer software program stored in the virtual non-volatile storage of the subscriber with new versions thereof, and wherein the method further comprises a step of automatically updating the application computer software program stored in the virtual non-volatile storage of the subscriber with new versions thereof.

8. The method of claim 1, wherein the step of enrolling, by the computer system, comprises the steps of receiving selected configuration options from the subscriber via the subscriber device, wherein one of the selected configuration options is indicative of the subscriber's desire to receive a virtual computing service including a automatic nightly backup of the virtual non-volatile storage of the subscriber, and wherein the method further comprises a step of automatically backing up the virtual non-volatile storage of the subscriber on a nightly basis.

9. The method of claim 1, wherein the step of enrolling, by the computer system, comprises the steps of receiving selected configuration options from the subscriber via the subscriber device, wherein one of the selected configuration options is indicative of the subscriber's desire to receive a virtual computing service including a automatic weekly backup of the virtual non-volatile storage of the subscriber, and wherein the method further comprises a step of automatically backing up the virtual non-volatile storage of the subscriber on a weekly basis.

10. The method of claim 1, wherein the step of enrolling, by the computer system, comprises the steps of:
establishing the a communication session with the subscriber device used by the subscriber;
causing the display of the selectable configuration options via the user interface at the subscriber device;
receiving selected configuration options selected by the subscriber from the subscriber device;
determining a cost to the subscriber associated with the provision of the virtual computing services associated with the selected configuration options;
receiving data indicative of the subscriber's agreement to pay the cost associated with the provision of the virtual computing services associated with the selected configuration options;
storing the selected configuration options; and,
terminating the communication session with the subscriber device.

11. The method of claim 1, wherein the step of enabling, by the computer system, access to and use of the virtual non-volatile storage comprises the steps of:
establishing a communication session with the subscriber device used by the subscriber for the communication session;
determining a preferred user interface for use by the subscriber device to interact with the virtual non-volatile storage, the preferred user interface having a plurality of user interface options selectable by the subscriber using the subscriber device and corresponding to respective performable tasks;
causing the display of the preferred user interface at the subscriber device;
receiving a user interface option selected from the displayed preferred user interface by the subscriber device;
performing a task associated with the received user interface option; and
terminating the communication session with the subscriber device.

12. The method of claim 11, wherein the step of determining comprises the steps of:
collecting information from the subscriber device indicative of the subscriber device type while establishing the communication session with the subscriber device; and
ascertaining a user interface most often used with the subscriber device type.

13. The method of claim 11, wherein the step of determining comprises a step of receiving a selection of the preferred user interface from the subscriber via the subscriber device during the communication session indicative of the subscriber's desire to use the preferred user interface at the subscriber device to interact with the virtual non-volatile storage.

14. The method of claim 11, wherein the step of performing comprises the steps of:
determining whether the task associated with the received user interface option corresponds to a data file upload task; and,
upon determining that the task associated with the received user interface option corresponds to a data file upload task, causing the uploading of a data file from the subscriber device to the virtual non-volatile storage of the subscriber.

15. The method of claim 11, wherein the step of performing comprises the steps of:
determining whether the task associated with the received user interface option corresponds to a data file download task; and,
upon determining that the task associated with the received user interface option corresponds to a data file download task, causing the download of a data file from the virtual non-volatile storage of the subscriber to the subscriber device.

16. The method of claim 11, wherein the step of performing comprises the steps of:

determining whether the task associated with the received user interface option corresponds to a request for execution of an application computer software program; and, upon determining that the task associated with the received user interface option corresponds to a request for execution of an application computer software program installed in the virtual non-volatile storage of the subscriber, causing the execution of the application computer software program.

17. An apparatus for providing virtual computing services to subscribers on a subscription basis, said apparatus comprising:

a server computer configured to:

provide first computing services to a first subscriber of a plurality of subscribers enrolled in a subscription-based services program for the receipt of computing services;

provide second computing services to a second subscriber of said plurality of subscribers enrolled in said subscription-based services program for the receipt of computing services; and output a user interface having one or more user selectable portions to enable subscriber selection of configuration options for respective computing services comprising at least:

selection of a virtual non-volatile storage capacity from at least two virtual non-volatile storage capacity configuration options;

selection of an operating system from at least two operating system options, said server computer configured to install the selected operating system to a virtual non-volatile storage having the selected storage capacity to provide respective computing services;

selection of one or more application computer software programs from a plurality of application computer software programs, said server computer is further configured to configure the virtual non-volatile storage with a selected application computer software program selected by said first subscriber; and selection of whether the server computer is to update the selected operating system and the one or more application computer software program when operating system and application computer software program updates are available; and enable access to said virtual non-volatile storage via said server computer during a communication session, wherein the server computer is configured to use information identifying a type of subscriber device to determine a user interface to be displayed on the subscriber device and used by the subscriber to access the virtual non-volitile storage;

wherein said server computer comprises a first virtual non-volatile storage associated uniquely with said first subscriber to provide said first computing services and a second virtual non-volatile storage associated uniquely with said second subscriber to provide said second computing services, said first virtual non-volatile storage being configured according to a first selected virtual non-volatile storage capacity, a first selected operating system, a first selected application computer software program, and a first selected update selection based upon configuration options selected by said first subscriber, and said second virtual non-volatile storage being configured according to a second selected virtual non-volatile storage capacity, a second selected operating system, a second selected application computer software program, and a second selected update selection based upon configuration options selected by said second subscriber.

18. The apparatus of claim 17, wherein said selected application computer software program comprises a word processing computer software program.

19. The apparatus of claim 17, wherein said selected application computer software program comprises an electronic mail computer software program.

20. The apparatus of claim 17, wherein said selected application computer software program comprises a spreadsheet computer software program.

21. The apparatus of claim 17, wherein said server computer is further operable to configure said second virtual non-volatile storage in accordance with configuration options paid for by said second subscriber.

22. The apparatus of claim 17, wherein said server computer is further operable to establish a communication session with a subscriber device used by said first subscriber and to execute said selected application computer software program stored in said first virtual non-volatile storage during said communication session.

23. The apparatus of claim 17, wherein said server computer is further operable to establish a communication session with a subscriber device used by said first subscriber and to interact with said subscriber device during said communication session via another user interface selectable by said first subscriber from a plurality of user interfaces.

24. The apparatus of claim 23, wherein said server computer is further operable to receive data identifying a selection of the other user interface by said first subscriber from said plurality of user interfaces, and to cause the display of the other user interface on said subscriber device used by said first subscriber.

25. The apparatus of claim 17, wherein said server computer is further operable to establish a communication session with a subscriber device used by said first subscriber and to interact with said subscriber device during said communication session via another user interface, and wherein said server computer is further operable to receive data identifying the other user interface as preferred to be utilized by said subscriber device and to cause the display of the other user interface on said subscriber device.

26. The apparatus of claim 17, wherein said server computer is further operable to configure said first virtual non-volatile storage with said selected application computer software program stored therein in accordance with a configuration option selected from the configuration options and paid for by said first subscriber through payment of a subscription fee.

27. The apparatus of claim 17, wherein said server computer is further operable to configure said first virtual non-volatile storage to have a storage capacity corresponding to said first selected virtual non-volatile storage capacity selected by said first subscriber and paid for by said first subscriber through payment of a subscription fee.

28. A computer storage medium having computer-executable instructions for providing subscription-based virtual computing services to a subscriber, the computer-executable instructions for performing steps comprising:

enrolling a subscriber for the provision of virtual computing services to said subscriber through a virtual non-volatile storage allocated uniquely to said subscriber and accessible to said subscriber via a server computer during a first communication session between said server computer and a subscriber device used by said subscriber, said virtual computing services corresponding to configuration options selectable by said subscriber;

exposing a user interface having a plurality of portions selectable by the subscriber to specify the configuration options for the virtual computing services including a least:

a portion selectable to specify a storage capacity of the virtual non-volatile storage from at least two storage capacity options;

a portion selectable to specify an operating system from at least two operating system options, said server computer operable to install a selected operating system to the virtual non-volatile storage having the selected storage capacity to provide the virtual computing services;

a portion selectable to specify whether the server computer is to update the selected operating system when operating system updates become available; and a portion selectable to specify when the server computer is to perform backups of the virtual non-volatile storage;

enabling access to and use of said virtual non-volatile storage via said server computer during a subsequent communication session between said server computer and a subscriber device, wherein the server computer is configured to use information identifying a type of subscriber device to determine a user interface to be displayed on the subscriber device and used by the subscriber to access the virtual non-volitile storage; and charging said subscriber a subscription fee in an amount related to selected configuration options received from said subscriber.

29. The computer storage medium of claim 28, wherein the step of enrolling comprises a step of configuring said non-volatile storage with a computer software program stored therein in accordance with a configuration option selected by said subscriber, and wherein the step of enabling access to and use of said virtual non-volatile storage comprises a step of executing said computer software program in response to receipt of a direction to execute said computer software program from said subscriber during said subsequent communication session.

30. The computer storage medium of claim 28, wherein the step of enabling access to and use of said virtual non-volatile storage comprises the steps of:

establishing said subsequent communication session with said subscriber device used by said subscriber for said subsequent communication session;

determining another user interface for use by said subscriber device to interact with said virtual non-volatile storage, said other user interface having a plurality of user interface options selectable by said subscriber using said subscriber device and corresponding to respective performable tasks;

causing the display of said other user interface at said subscriber device;

receiving a user interface option selected from said other user interface by said subscriber;

performing a task associated with said received user interface option; and terminating said subsequent communication session with said subscriber device.

31. The computer storage medium of claim 30, wherein the step of determining comprises the steps of:

collecting information from said subscriber device used by said subscriber during said subsequent communication session while establishing said subsequent communication session with said subscriber device, said information being indicative of the subscriber device type of said subscriber device; and, ascertaining a user interface most often used with said subscriber device type.

32. The computer storage medium of claim 30, wherein the step of determining comprises a step of receiving a selection of said other user interface from said subscriber via said subscriber device used by said subscriber during said subsequent communication session, said selection being indicative of said subscriber's desire to use said other user interface at said subscriber device used by said subscriber during said subsequent communication session.

* * * * *